United States Patent
Yamaoka et al.

(10) Patent No.: US 8,250,415 B2
(45) Date of Patent: Aug. 21, 2012

(54) OPTICAL DISK REPRODUCTION APPARATUS, OPTICAL DISK REPRODUCTION METHOD, REPRODUCTION PROCESSING DEVICE AND REPRODUCTION PROCESSING METHOD

(75) Inventors: Masaru Yamaoka, Osaka (JP); Yuji Takagi, Osaka (JP); Makoto Usui, Osaka (JP)

(73) Assignee: Panasonic Corporation, Osaka (JP)

( * ) Notice: Subject to any disclaimer, the term of this patent is extended or adjusted under 35 U.S.C. 154(b) by 67 days.

(21) Appl. No.: 13/055,843

(22) PCT Filed: May 18, 2010

(86) PCT No.: PCT/JP2010/003350
§ 371 (c)(1),
(2), (4) Date: Jan. 25, 2011

(87) PCT Pub. No.: WO2010/134328
PCT Pub. Date: Nov. 25, 2010

(65) Prior Publication Data
US 2012/0096326 A1    Apr. 19, 2012

(30) Foreign Application Priority Data

May 21, 2009    (JP) .................................. 2009-122889

(51) Int. Cl.
*G11C 29/00* (2006.01)
(52) U.S. Cl. .......................... 714/700; 714/775; 369/100
(58) Field of Classification Search .................. 714/700, 714/775; 369/100
See application file for complete search history.

(56) References Cited

U.S. PATENT DOCUMENTS

| | | | | |
|---|---|---|---|---|
| 5,901,159 A | * | 5/1999 | Ichikawa | ...................... 714/765 |
| 6,219,322 B1 | | 4/2001 | Kobayashi | |
| 7,248,558 B2 | | 7/2007 | Kobayashi et al. | |
| 7,564,756 B2 | * | 7/2009 | Akiyama | ................... 369/53.31 |

(Continued)

FOREIGN PATENT DOCUMENTS

JP    10-134527    5/1998
(Continued)

OTHER PUBLICATIONS

International Search Report issued Jun. 29, 2010 in International (PCT) Application No. PCT/JP2010/003350.
"Standard ECMA-267 120 mm DVD-Read-Only Disk", 3rd Edition, Apr. 2001.

*Primary Examiner* — M. Mujtaba K Chaudry
(74) *Attorney, Agent, or Firm* — Wenderoth, Lind & Ponack, L.L.P.

(57) ABSTRACT

Provided is an optical disk reproduction apparatus capable of preventing information that is different from the original sub information from being subjected to error correction erroneously, and of stably reproducing the sub information. The optical disk reproduction apparatus (1) has an optical head (301) for reading a reproduction signal including main information and sub information based on a recording mark formed on an optical disk (300), a main information extraction unit (4) for extracting the main information from the reproduction signal, and a sub information extraction unit (2) for extracting the sub information from the reproduction signal. The sub information extraction unit (2) determines a reproduction accuracy of the sub information, and includes an error correction control unit (308) for deciding a timing of performing error correction of the sub information according to the determined reproduction accuracy, and an error correction unit (309) for performing the error correction of the sub information according to the timing decided with the error correction control unit (308).

13 Claims, 14 Drawing Sheets

U.S. PATENT DOCUMENTS

| | | |
|---|---|---|
| 7,596,075 B2 | 9/2009 | Kobayashi et al. |
| 7,649,824 B2 * | 1/2010 | Kadowaki et al. ......... 369/59.24 |
| 2004/0001414 A1 * | 1/2004 | Kadowaki et al. ......... 369/59.24 |
| 2005/0063265 A1 | 3/2005 | Akiyama |
| 2005/0122889 A1 | 6/2005 | Kobayashi et al. |
| 2007/0297318 A1 | 12/2007 | Kobayashi et al. |
| 2009/0190451 A1 | 7/2009 | Akiyama |
| 2009/0196140 A1 | 8/2009 | Yamaoka et al. |
| 2009/0285058 A1 | 11/2009 | Kobayashi et al. |

FOREIGN PATENT DOCUMENTS

| | | |
|---|---|---|
| JP | 11-126426 | 5/1999 |
| JP | 2001-357533 | 12/2001 |
| JP | 2002-358739 | 12/2002 |
| JP | 2004-213781 | 7/2004 |
| JP | 2005-108405 | 4/2005 |
| WO | 2007/139077 | 12/2007 |

* cited by examiner

OPTICAL DISK REPRODUCTION APPARATUS, OPTICAL DISK REPRODUCTION METHOD, REPRODUCTION PROCESSING DEVICE AND REPRODUCTION PROCESSING METHOD

TECHNICAL FIELD

The present invention relates to an optical disk reproduction apparatus and an optical disk reproduction method for reproducing main information and sub information recorded on an optical disk, and a reproduction processing device and a reproduction processing method for processing a reproduction signal including main information and sub information read based on a recording mark formed on an optical disk.

BACKGROUND ART

For example, Patent Literature 1 discloses an optical disk reproduction apparatus that involves error correction, and this optical disk reproduction apparatus issues a warning to the user according to the condition of the information recording surface of the optical disk.

Patent Literature 1 determines the availability of error correction of the reproduced data or counts the number of symbols that executed the correction, estimates the condition of the information recording surface of the optical disk according to the count result, and thereby warns the user. As a result of using Patent Literature 1, the user is able to accurately learn of an optical disk with inferior recording quality, and take measures such as backing up the data.

Moreover, for example, Patent Literature 2 discloses an optical disk reproduction apparatus for reading, from an optical disk, main information such as contents information as well as identifying information (sub information) requiring integral detection, and this optical disk reproduction apparatus reproduces sub information in which unauthorized duplication is difficult.

According to Patent Literature 2, the main information such as contents information is recorded with a recording mark, and the identifying information required for the reproduction of the main information is recorded by displacing the edge of the recording mark in the track direction. The optical disk reproduction apparatus of Patent Literature 2 generates a correlation signal based on the M series, extracts the displacement direction of the recording mark edge, and performs integration by associating the displacement direction of the recording mark edge with the M series. It is thereby possible to reproduce identifying information which is impossible to copy or reproduce under normal circumstances, and realize the copyright protection of the main information.

Moreover, for example, Patent Literature 3 discloses an optical disk reproduction apparatus capable of stably and accurately reading second digital information as the copyright protection information without being influenced by defects and pit fallouts existing on a disk-shaped recording medium.

In Patent Literature 3, with respect to the second digital information that is recorded by wobbling the pit sequence that is recorded as a first signal on the disk-shaped recording medium, a plurality of bits configuring the second digital information is sorted and recorded in unit intervals of the same synchronizing signal contained in the foregoing first signal. Subsequently, the plurality of bits configuring the second digital information recorded as described above are read a plurality of times for each of the unit intervals of the synchronizing signal during the reproduction, and information of the foregoing bits that were read is integrated. It is thereby possible to integrate information from the numerous wobbling pits across the unit intervals of a plurality of synchronizing signals, and determine the value of the respective bits.

Moreover, for example, Patent Literature 4 discloses an optical disk reproduction apparatus capable of shortening the processing time while maintaining a predetermined accuracy regarding the detection of additional information recorded on an optical disk based on the slight displacement of pits.

In Patent Literature 4, the optical disk reproduction apparatus comprises a detection circuit for detecting a push-pull signal, and an integration circuit for integrating the push-pull signal and detecting the additional information by performing binarization processing to the integrated result. Moreover, this optical disk reproduction apparatus additionally comprises a control circuit for controlling the total number of frames to be used for creating valid additional information in the integration circuit. The control of this control circuit is performed based on the error correction result in the error correction circuit.

Nevertheless, the foregoing conventional optical disk reproduction apparatuses are not equipped with a function for controlling the timing of implementing the error correction in the integration detection of the sub information that has been subjected to error correction encoding. Moreover, in the integral detection, the detection accuracy of the sub information will increase as the integral width becomes longer. Nevertheless, if the error correction processing is implemented in a state where the integration interval is short and the detection accuracy of the sub information is extremely inferior, the error correction effect is minimal, and there is a problem that the probability of so-called erroneous correction of correcting the wrong code will increase.

For example, the optical disk reproduction apparatus of Patent Literature 1 estimates the recording condition of the optical disk based on the error correction result, and, to begin with, does not perform integral detection. Thus, Patent Literature 1 does not disclose controlling the timing of implementing the error correction.

Moreover, although Patent Literatures 2 and 3 disclose the integral detection of the sub information, they do not disclose controlling the timing of implementing the error correction of the sub information that has been subjected to error correction encoding.

Moreover, although Patent Literature 4 determines whether to continue the integration based on the error correction result of the integral detection, the size of the integral value, and the variation of the integral value, it does not disclose controlling the timing of starting the error correction.

CITATION LIST

Patent Literature

Patent Literature 1: Japanese Patent Application Laid-open No. H10-134527
Patent Literature 2: Japanese Patent Application Laid-open No. H11-126426
Patent Literature 3: Japanese Patent Application Laid-open No. 2004-213781
Patent Literature 4: Japanese Patent Application Laid-open No. 2005-108405

SUMMARY OF INVENTION

The present invention was devised in order to resolve the foregoing problems. Thus, an object of this invention is to provide an optical disk reproduction apparatus, an optical disk reproduction method, a reproduction processing device and a reproduction processing method capable of preventing information that is different from the original sub information from being subjected to error correction erroneously, and of stably reproducing the sub information.

The optical disk reproduction apparatus according to one aspect of the present invention is an optical disk reproduction apparatus for reproducing main information and sub information recorded on an optical disk comprising an optical head for reading a reproduction signal including the main information and the sub information based on a recording mark formed on the optical disk, a main information extraction unit for extracting the main information from the reproduction signal read with the optical head, and a sub information extraction unit for extracting the sub information from the reproduction signal read with the optical head, wherein the sub information extraction unit includes a reproduction accuracy determination unit for determining a reproduction accuracy of the sub information, an error correction timing control unit for deciding a timing of performing error correction of the sub information according to the reproduction accuracy determined with the reproduction accuracy determination unit, and an error correction unit for performing the error correction of the sub information according to the timing decided with the error correction timing control unit.

According to the present invention, since the reproduction accuracy of the sub information is determined and the timing of performing the error correction of the sub information is decided according to the determined reproduction accuracy, it is possible to prevent information that is different from the original sub information from being subjected to error correction erroneously, and stably reproduce the sub information as a result of performing the error correction in a state where the reproduction accuracy of the sub information is high.

The object, features and advantages of the present invention shall become apparent from the appended drawings and the ensuing explanation.

DESCRIPTION OF EMBODIMENTS

Embodiments of the present invention are now explained with reference to the appended drawings. Note that the following embodiments are examples that embody the present invention, and are not intended to limit the technical scope of the present invention.

(First Embodiment)

Figures 1A, 1B:
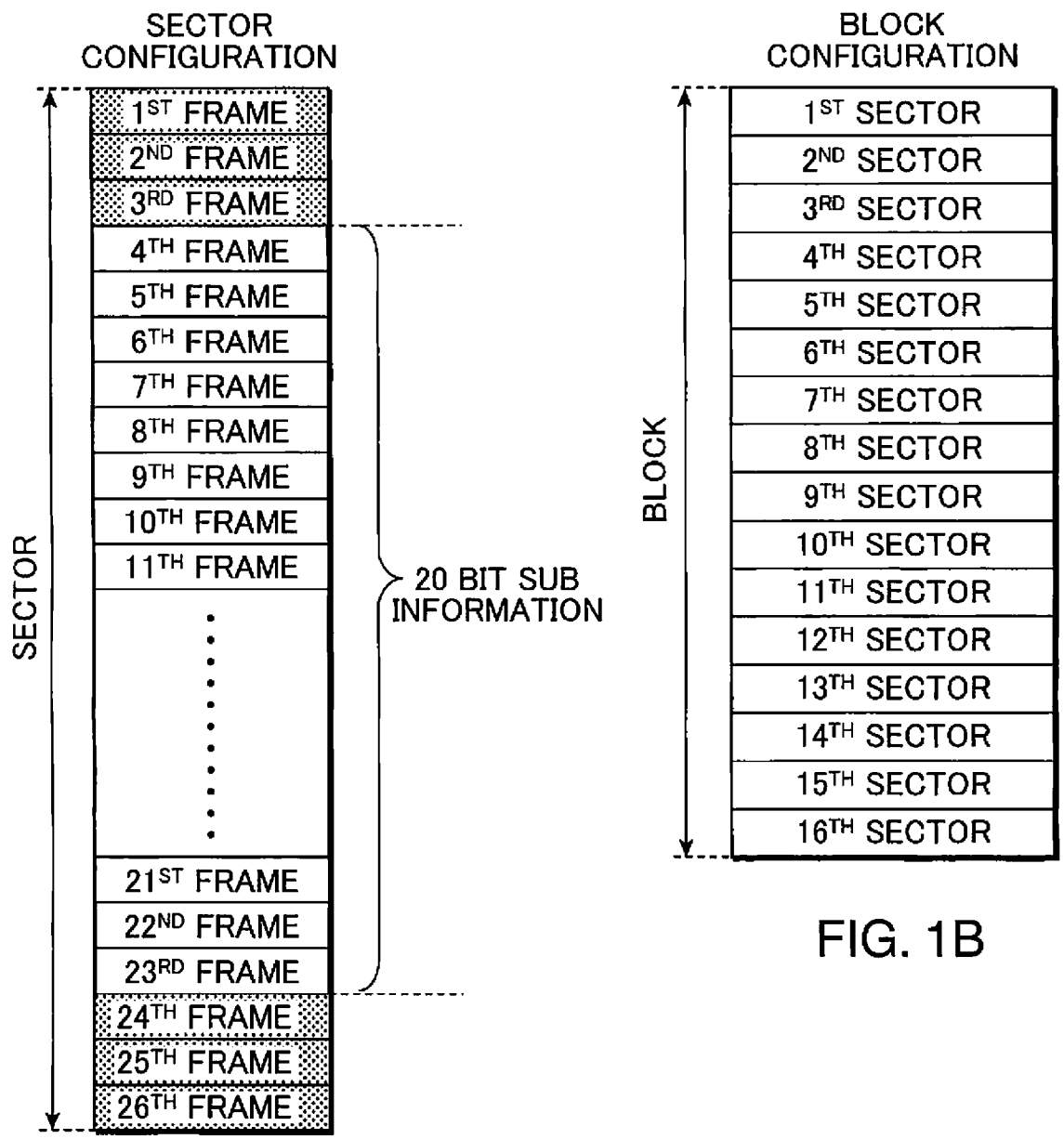
FIG. 1A is a diagram showing the sector configuration of the main information of the optical disk according to the first embodiment of the present invention.
FIG. 1B is a diagram showing the block configuration of the main information of the optical disk according to the first embodiment of the present invention.

FIG. 1 is a conceptual diagram showing the recording format of the sub information in the first embodiment of the present invention. FIG. 1A is a diagram showing the sector configuration of the main information of the optical disk according to the first embodiment of the present invention, and FIG. 1B is a diagram showing the block configuration of the main information of the optical disk according to the first embodiment of the present invention.

In the first embodiment, the optical disk is, for example, a DVD (Digital VideoNersatile Disc). A sector with address information is configured from 26 frames associated with synchronization code. Moreover, a frame is configured from 8-16 modulated main information of 1488 channel bits. Moreover, the frame top 32 channel bit zone stores the synchronization code that is required for frame synchronization, and the synchronization code is configured from a frame identifying information part for determining the frame location in the sector, and a synchronizing part as a fixed pattern in all synchronization codes. In the case of a DVD, the synchronizing part is a fixed pattern of 14T4T, and the 14T channel data only appears in the synchronizing part. Moreover, in the case of a DVD, there are eight types of frame identifying information parts; namely, "SY0" to "SY7", and the frame location in the sector can be decoded based on the arrangement of the frame identifying information parts of two consecutive frames.

The sub information of the optical disk of this embodiment is recorded one bit at a time for each frame in the 20 frames among the 26 frames in one sector excluding the top 3 frames and the last 3 frames.

The sub information is recorded by altering the pattern of the frame identifying information part in the synchronization code that is assigned to the top of the respective frames.

For example, under normal circumstances, the frame identifying information part of the fourth frame in the sector is "SY3", and the frame identifying information part of the preceding third frame is "SY2". Nevertheless, if the bit value "1" of the sub information is recorded in the fourth frame, the frame identifying information part is altered to a pattern that is not "SY3". Meanwhile, if the bit value "0" of the sub information is recorded in the fourth frame, the frame identifying information part is not altered. Accordingly, with the optical disk reproduction apparatus of the first embodiment, the frame location is specified by detecting the synchronizing part of the synchronization code for each frame in the sector, and the sub information can be detected by detecting whether the frame identifying information part has been altered.

In the first embodiment, as with the sector configuration shown in FIG. 1A, sub information is never recorded in the top 3 frames and the last 3 frames in the sector. Accordingly, the frame identifying information part of the top 3 frames and the last 3 frames in the sector is never altered. As described above, since the value "SY0" of the frame identifying information part assigned only to the top frame of the sector will not be altered, even if the frame identifying information part is altered, the top location of the sector can be accurately extracted as a result of detecting "SY0" without deteriorating the detection accuracy of the top frame in the sector. Thus, if the synchronizing part of the synchronization code is detected, the frame location in the sector can be determined even if the frame identifying information part is not correctly detected.

Moreover, with a DVD, the sector address information is stored in the top frame in the sector. Thus, the top frame has high importance in the reproduction of main information in comparison to the other frames in the sector. In order to prevent the reading accuracy of the main information from deteriorating as a result of altering the frame identifying information part of the foregoing frame with high importance, sub information is not recorded in the frames (in this example, the top 3 frames and the last 3 frames of the sector) in the vicinity of the top frame to which the sector address information is assigned. In a Blu-ray disk also, the sector address information is stored across the top 3 frames in the sector.

Accordingly, the optical disk of the first embodiment is stored with 20 bit sub information in one sector.

Moreover, FIG. 1B is a diagram showing the block configuration of the optical disk of the first embodiment. A block is the smallest logical reading unit recorded with main information that has been subjected to error correction encoding, and is configured from 16 sectors. Accordingly, the optical disk of the first embodiment is recorded with 320 bit (40 byte) sub information in one block.

Moreover, with the optical disk of the first embodiment, the same 320 bit sub information is repeatedly recorded in block units in several ten consecutive blocks. Needless to say, the main information in block units is different from the sub information, and respectively different main information is recorded.

Figure 2:
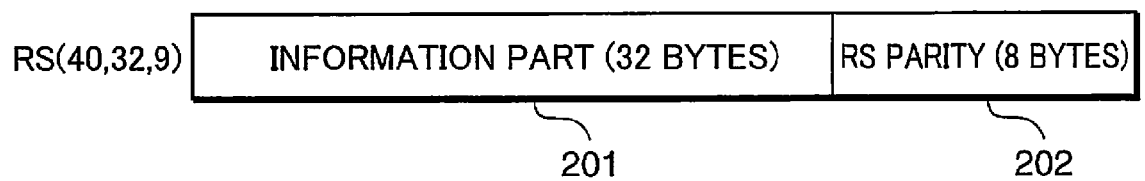
FIG. 2 is a conceptual diagram showing the data structure of the sub information that has been subjected to error correction encoding in the first embodiment of the present invention.

FIG. 2 is a conceptual diagram showing the data structure of the sub information that has been subjected to error correction encoding in the first embodiment of the present invention. The optical disk of the first embodiment is recorded with 320 bit (40 byte) sub information in one block. The 40 byte sub information is information that has been subjected to error correction encoding in which an 8 byte RS parity 202 is assigned to a 32 byte information part 201. The first embodiment explains a case of using the Reed-Solomon code in the error correction encoding. Thus, the first embodiment uses the error correction encoding of the RS (40, 32, 9) in which the code length of the sub information is 40 bytes, the information length is 32 bytes, the parity is 8 bytes, and the code distance is 9. In the foregoing case, even if an error of at least 3 bytes occurs during the reproduction, such error can be corrected to the correct sub information by performing error correction.

Note that the main information includes, for example, contents information encrypted with an encryption key, and the sub information includes, for example, an encryption key that is required for reproducing the contents information. Specifically, the sub information is information that is required for reproducing the main information.

Figure 3:
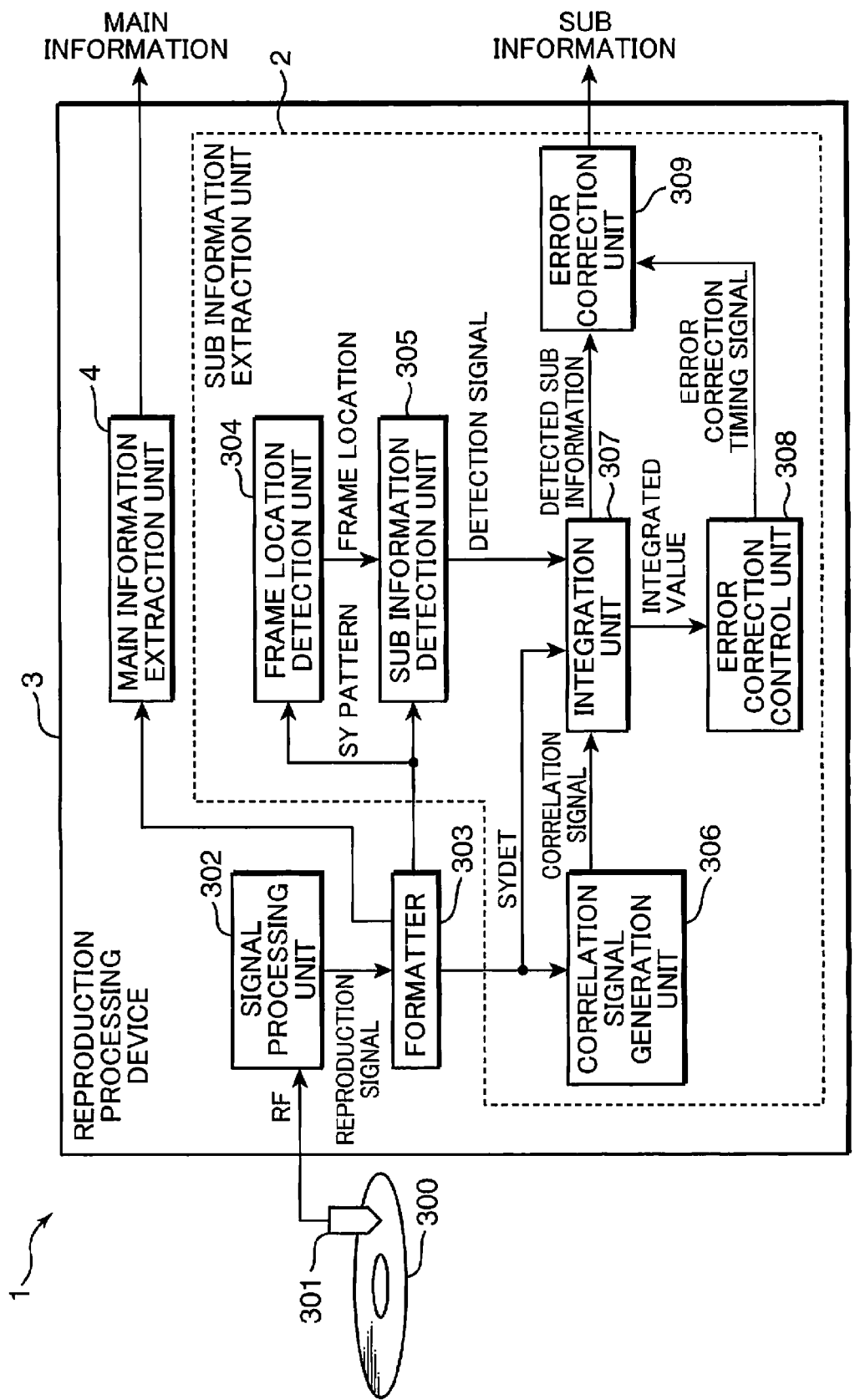
FIG. 3 is a block diagram showing the configuration of the optical disk reproduction apparatus in the first embodiment of the present invention.

FIG. 3 is a block diagram showing the configuration of the optical disk reproduction apparatus in the first embodiment of the present invention.

The optical disk reproduction apparatus 1 of the first embodiment reproduces information recorded on an optical disk 300. The optical disk reproduction apparatus 1 comprises an optical head 301 and a reproduction processing device 3.

The optical head 301 reads the RF signal (reproduction signal) including the main information and the sub information based on the recording mark formed on the optical disk 300. The optical head 301 irradiates a laser beam on the rotating optical disk 300, and outputs the RF signal showing the level of the reflected light from the optical disk 300 to the signal processing unit 302. Moreover, the optical head 301 is subjected to focus control to the recording surface of the optical disk 300 and tracking control to the recording mark track of the optical disk 300 based on a servo unit not shown.

The reproduction processing device 3 processes a reproduction signal including the main information and the sub information read based on the recording mark formed on the optical disk 300. The reproduction processing device 3 comprises a sub information extraction unit 2, a main information extraction unit 4, a signal processing unit 302 and a formatter 303.

The signal processing unit 302 performs signal amplification, waveform equalization and analog/digital conversion to the RF signal from the optical head 301, thereafter performs binarization to generate a reproduction signal, and outputs this to the formatter 303. Moreover, the signal processing unit 302 is internally provided with a PLL (Phase Locked Loop) circuit, and generates a clock signal that is synchronized with the RF signal. The foregoing clock signal becomes the reference clock upon subsequently operating the digital circuit part.

The formatter 303 synchronizes the reproduction signal in frame units by detecting the synchronization code that is assigned in frame units for each given interval from the input reproduction signal, and decodes the address information in sector units. Moreover, the formatter 303 demodulates the modulated reproduction signal, and performs error correction of the main information that has been subjected to error correction encoding in block units. Moreover, the formatter 303 extracts an SY pattern as the synchronization code for each frame, and outputs this to the frame location detection unit 304 and the sub information detection unit 305. Moreover, the formatter 303 detects a synchronizing part as the fixed pattern of the synchronization code from the reproduction signal, and outputs the detected synchronizing part as SYDET to the correlation signal generation unit 306 and the integration unit 307.

The main information extraction unit 4 extracts the main information from the reproduction signal. The main information extraction unit 4 performs error correction to the reproduced data output from the formatter 303 in block (ECC (Error Correction Code) block) units, and reproduces the contents information or data that is required for reproducing the contents information as the main information. The main information is formed on the optical disk 300 as a concave and convex recording mark.

The sub information extraction unit 2 extracts the sub information from the reproduction signal. The sub information extraction unit 2 extracts the sub information that has been subjected to error correction encoding by detecting at least one among alteration of a predetermined pattern of data recorded in the pattern with the recording mark, modification of the recording mark, and displacement of the recording mark.

The sub information is repeatedly recorded a plurality of times in predetermined recording area units of the optical disk 300. The sub information extraction unit 2 extracts the sub information based on an integral value obtained by integrating a detection signal detected for each of the predetermined recording areas. Moreover, the sub information extraction unit 2 generates a correlation signal synchronized with the reproduction signal and integrates the correlation of the correlation signal and the detection signal.

The sub information extraction unit 2 is configured from a frame location detection unit 304, a sub information detection unit 305, a correlation signal generation unit 306, an integration unit 307, an error correction control unit 308 and an error correction unit 309.

The frame location detection unit 304 decodes the frame location information in the sector based on the input SY pattern. As the actual operation, the frame location detection unit 304 initializes the frame counter to "0" as the top frame in the sector if the frame identifying information part of the SY pattern is "SY0". Meanwhile, the frame location detection unit 304 increments the frame counter if the synchronizing part of the SY pattern shows a fixed pattern for the frame synchronization and the frame identifying information part is not "SY0". Accordingly, in the case of a DVD, the value of the frame counter in the sector will change from 0 to 25, and initialized to 0 at the top location of the sector. Accordingly, the frame location in the sector can be determined with the frame counter. The obtained frame location is output to the sub information detection unit 305.

The sub information detection unit 305 generates a detection signal of one bit worth of the sub information based on the SY pattern from the formatter 303 and the frame location from the frame location detection unit 304. The sub information detection unit 305 internally stores, in advance, the SY pattern of the normal (standard) frame identifying information part according to the frame location. The sub information detection unit 305 compares the SY pattern of the corresponding normal frame identifying information part according to the input frame location and the SY pattern of the frame identifying information part that was reproduced from the formatter 303, and, if they coincide, outputs "+1" as the detection signal to the integration unit 307, and, if they do not coincide, outputs "−1" as the detection signal to the integration unit 307.

Specifically, in the case of a DVD, the normal frame identifying information part of the fourth frame in the sector is "SY3". Thus, if the SY pattern of the fourth frame of the reproduction signal is "SY3", "+1" is output as the detection signal. Meanwhile, if the SY pattern of the fourth frame of the reproduction signal is not "SY3", "−1" is output as the detection signal. Note that the sector format of a DVD-ROM is disclosed in FIG. 23 of the "Standard ECMA-267 120 mm DVD-Read-Only Disk".

The correlation signal generation unit 306 is configured from a pseudo random number generator that generates the M series, the Gold series or the like. The pseudo random number generator is configured as an LFSR (Linear Feedback Shift Register). The correlation signal generation unit 306 generates the pseudo random number series one bit at a time for each frame by setting the initial value that is retained internally in secrecy in the LFSR at the timing that "SY0" as the frame identifying information part of the top frame in the sector is detected, and shifting the internal value at the timing that SYDET showing the top of the frame is output. The correlation signal generation unit 306 outputs the generated pseudo random number series as a correlation signal to the integration unit 307.

Note that the correlation signal is generated in synchronization with the reproduction signal of the main information as the output of the signal processing unit 302. In reality, the signal processing unit 302 has a PLL (Phase Locked Loop) circuit for extracting the clock signal synchronized with the reproduction signal. The correlation signal generation unit 306 is able to generate a correlation signal synchronized with the reproduction signal by generating a correlation signal synchronized with the clock signal as the output from the PLL circuit.

The integration unit 307 has an integration counter corresponding to the bit count (320 bits in the first embodiment) of the sub information. The integration unit 307 switches the integration counter each time SYDET is output. The integration unit 307 increments the value of the internal integration counter if the detection signal is "−1" and the correlation signal is "0" or if the detection signal is "+1" and the correlation signal is "1". Moreover, the integration unit 307 decrements the value of the internal integration counter if the detection signal is "−1" and the correlation signal is "1" or if the detection signal is "+1" and the correlation signal is "0". The integration unit 307 thereby calculates the correlation value of the detection signal and the correlation signal.

Accordingly, if the detection signal is "−1" and the correlation signal is "0" or if the detection signal is "+1" and the correlation signal is "1", the value of the internal integration counter is increased in the + direction since the detection signal and the correlation signal are correlated. Meanwhile, if the detection signal is "−1" and the correlation signal is "1" or if the detection signal is "+1" and the correlation signal is "0", the value of the internal integration counter is decreased in the − direction since the detection signal and the correlation signal are not correlated (are of a reverse correlation).

The optical disk of the first embodiment is recorded with 320 bit sub information in one block as described above. Accordingly, at the time that the sub information of one block is read, the value of the integration counter of the 320 bits will show a value of "+1" or "−1". Specifically, the integration of one bit worth of the sub information is calculated only once in one block.

Moreover, the bit sequence of the sub information in the first embodiment is explained as though bit 0 to bit 319 are aligned. Accordingly, the value of the integration counter corresponding to the bit 0 is updated in the fourth frame of the top sector in the block, and the value of the integration counter corresponding to the bit 1 is updated in the subsequent fifth frame. Moreover, the integration counter corresponding to the bit 319 is updated for the twenty-third frame of the last sector (that is, the sixteenth sector) in the block.

Upon reading the sub information, under ideal conditions, the synchronization code with an altered pattern is read in an altered state, and the synchronization code with an unaltered pattern is read as is. Nevertheless, during the actual reading, even if an altered pattern is recorded, there are cases where the altered pattern is identified as an unaltered pattern, and cases where, even if an unaltered pattern is recorded, such unaltered pattern is identified as an altered pattern due to erroneous reading as a result of influences such as the recording quality of the recording mark, reproduction condition, scratches and dust on the disk surface, and so on.

Thus, as a result of integration being performed in interval of a plurality of blocks, the authentic pattern can be read. Logically, the signal component will improve in proportion to the length (count) of the integration interval based on the integral effect, and the noise component will decrease in proportion to the square root (root rule) of the integration interval. Accordingly, the longer the integration interval becomes, the reading accuracy of the sub information will improve due to the integral effect.

Moreover, the integration unit 307 extracts, as the 320 bit detected sub information, the code of the integral value corresponding to the respective bits at least when the time reading in one block units is ended, and outputs this to the error correction unit 309, and additionally outputs the respective integral values corresponding to the 320 bits to the error correction control unit 308.

Figure 4:
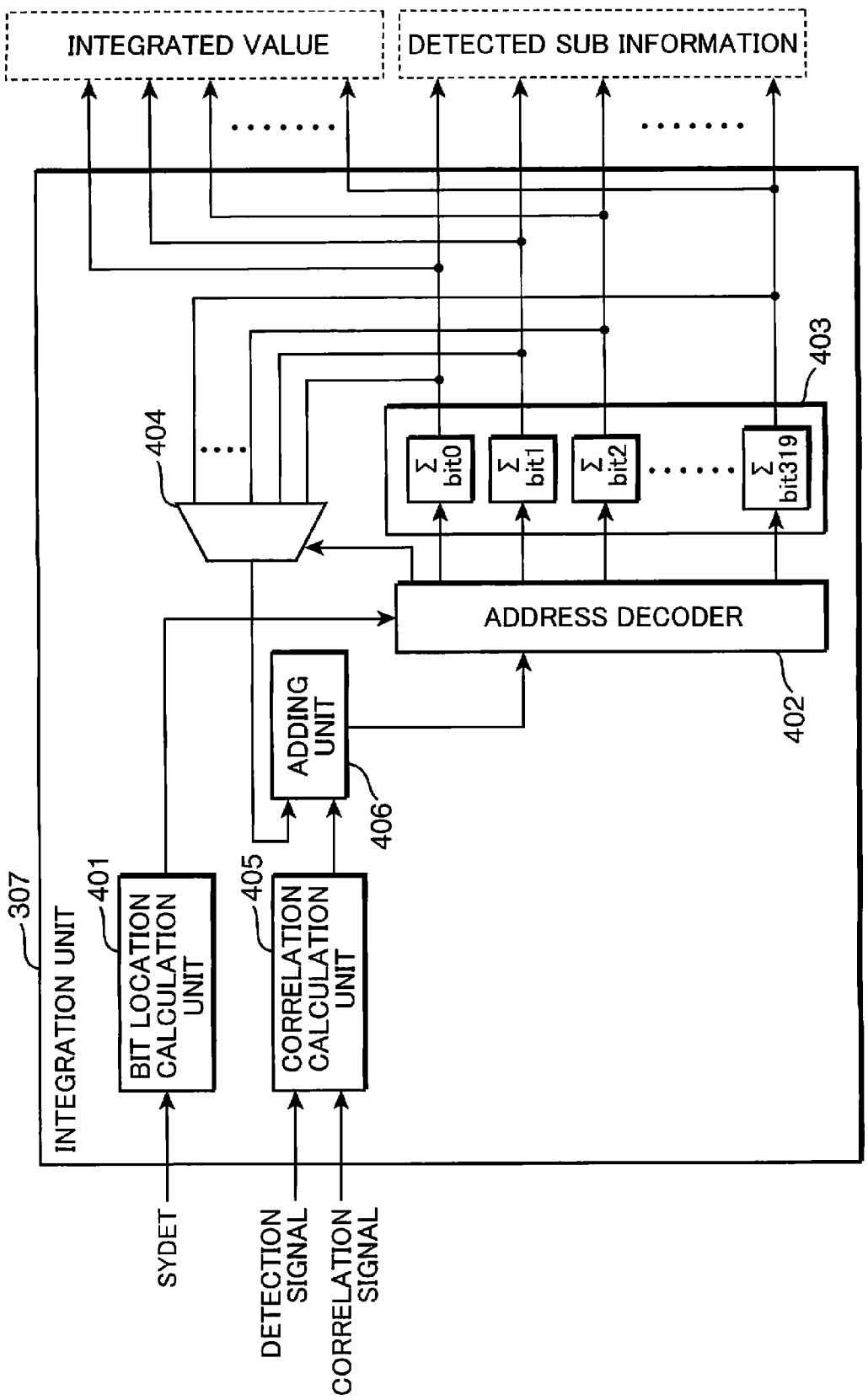
FIG. 4 is a block diagram showing the detailed configuration of the integration unit in the first embodiment of the present invention.

FIG. 4 is a block diagram showing the detailed configuration of the integration unit 307 in the first embodiment of the present invention.

The integration unit 307 is configured from a bit location calculation unit 401, an address decoder 402, an integrator 403, a selector 404, a correlation calculation unit 405 and an adding unit 406.

The bit location calculation unit 401 calculates the bit location of the sub information to be detected based on the address information assigned in sector units of the main information, and the frame address as the frame location in the sector. In the first embodiment, the sub information is recorded according to the sector configuration shown in FIG. 1. Bit 0 of the sub information is recorded in the fourth frame of the top sector (first sector) in the zone (block) recording the sub information, bit 1 is recorded in the subsequent fifth frame, bit 2 is recorded in the sixth frame, and bit 319 is recorded in the twenty-third frame of the last sector (sixteenth sector), and sub information of 320 bits (40 bytes) is recorded in one block. As described above, the bit location calculation unit 401 calculates the bit location of the sub information to be detected based on the sector address and the frame address, and outputs the calculated bit location to the address decoder 402.

The address decoder 402 decodes the address of the integrator 403 corresponding to the sub information bit location input from the bit location calculation unit 401. The integration unit 307 has integrators 403 corresponding to one bit of sub information in the quantity of the bit count of the sub information. In the first embodiment, since 320 bit sub information is recorded for each block, the integration unit 307 comprises 320 integrators 403. The address decoder 402 converts the bit location information from the bit location calculation unit 401 into a register address of the integrator 403 corresponding to the bit location information, and outputs this to the selector 404.

The integrator 403 is configured from a register for integrating and retaining the correlation value for each bit of the sub information. Moreover, the integrator 403 is configured from a register in the quantity of the bit count of the sub information, and retains the correlation integral value corresponding to one bit of sub information.

The selector 404 selects the integral value corresponding to the bit location of the sub information that is currently being read from the integrator 403 according to the register address that was converted from the bit location information of the sub information by the address decoder 402. The selected integral value is output to the adding unit 406.

The correlation calculation unit 405 calculates the correlation value of the input detection signal and correlation signal. The correlation calculation unit 405 outputs the correlation value of "+1" to the adding unit 406 if the detection signal is "−1" and the correlation signal is "0" or if the detection signal is "+1" and the correlation signal is "1" since both signals are correlated. Moreover, the correlation calculation unit 405 outputs the correlation value of "−1" to the adding unit 406 if the detection signal is "−1" and the correlation signal is "1" or if the detection signal is "+1" and the correlation signal s "0" since both signal are not correlated (are of a reverse correlation).

The adding unit 406 updates the correlation integral value of the integrator 403 by adding the correlation integral value corresponding to the bit location of the sub information current being read that was selected by the selector 404, and the correlation value of "+1" or "−1" that is output from the correlation calculation unit 405. Thus, the integral value corresponding to the respective bits of the sub information of the integrator 403 increases in the +direction if it is a modification of the pattern of the synchronization signal correlated with the correlation signal, and decreases in the —direction if it is a modification of the pattern of the synchronization code anti-correlated with the correlation signal.

Moreover, the integrator 403 is integrated with the two's complement. Accordingly, the value of the most significant bit of the integral value of the integrator 403 will show whether the correlation integral value is a positive number or a negative number. The value of the most significant bit of the integral value of the respective integrators 403 is detected as the detected sub information of the respective bits and output to the error correction unit 309, and the integral value of the respective bits is output to the error correction control unit 308. In the first embodiment, the detected sub information and the integral value are output when the reading of one block is complete. The integration unit 307 thereby outputs the detected sub information and the integral value after all bits of the recorded sub information are detected.

The error correction control unit 308 determines the reproduction accuracy of the reproduced sub information. Moreover, the error correction control unit 308 determines the reproduction accuracy based on the integral value. In addition, the error correction control unit 308 decides the timing of performing the error correction of the sub information according to the reproduction accuracy. The error correction unit 309 performs the error correction of the sub information according to the timing that is decided with the error correction control unit 308.

The error correction control unit 308 controls the timing of implementing the error correction by determining whether to implement the error correction processing of the detected sub information based on the integral value input from the integration unit 307. The error correction control unit 308 controls the timing of implementing the error correction based any one of the following methods; namely, a first method (FIG. 5) of determining the average value of the detected integral values based on a threshold, a second method (FIG. 6) of determining the variation of the detected integral values based on a threshold, or a third method (FIG. 7) of determining the integral value for each detected bit based on a threshold.

Figure 5:
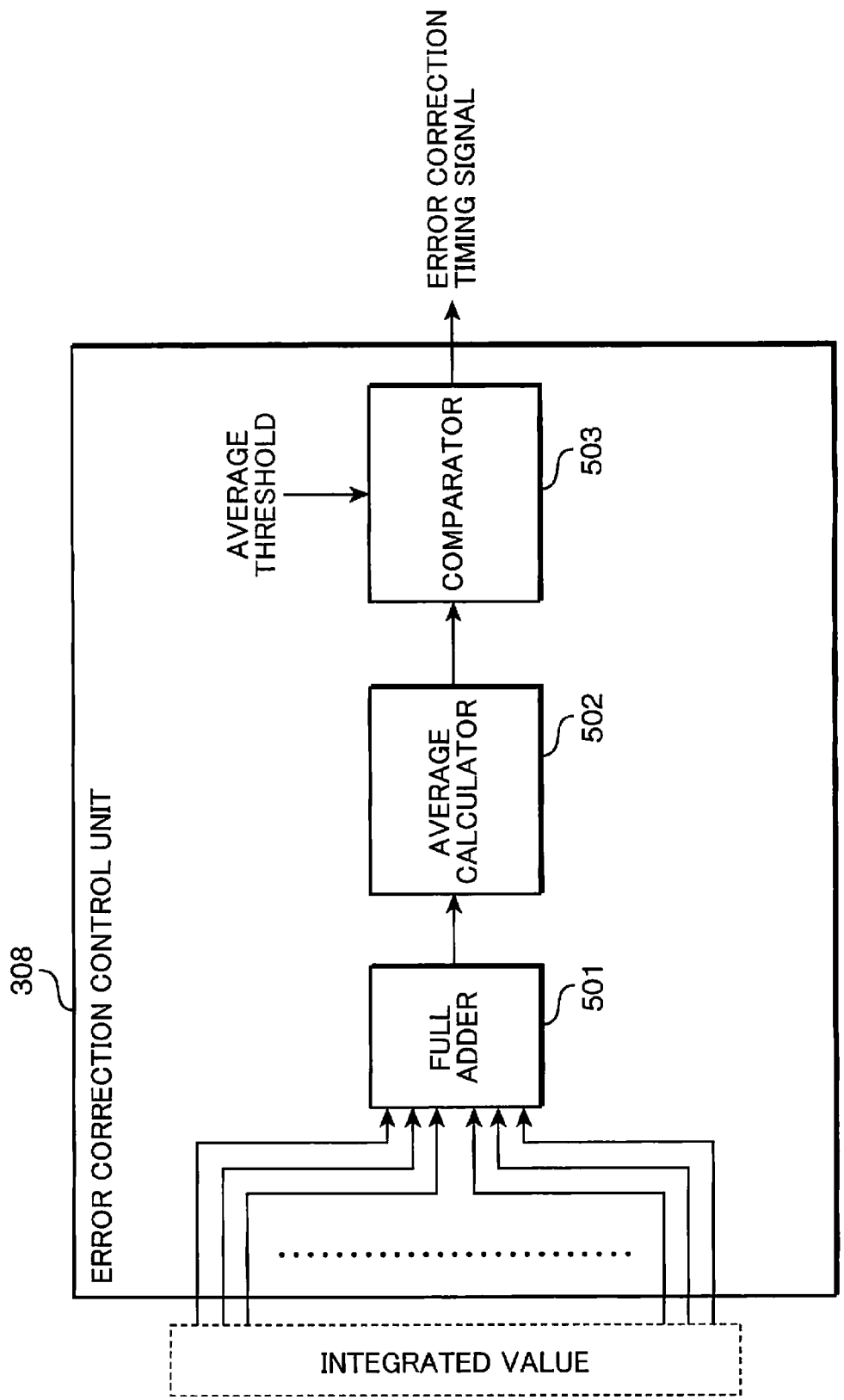
FIG. 5 is a block diagram showing the detailed configuration of the error correction control unit for deciding a timing of performing the error correction based on the first method in the first embodiment of the present invention.

The first method of determining whether to implement the error correction is foremost explained. FIG. 5 is a block diagram showing the detailed configuration of the error correction control unit for deciding a timing of performing the error correction based on the first method in the first embodiment of the present invention. The first method decides the timing of performing the error correction by determining the average value of the detected integral values based on a threshold.

The error correction control unit 308 is configured from a full adder 501, an average calculator 502 and a comparator 503.

The full adder 501 adds all absolute values of the integral values corresponding to the respective bits of the sub information that is output in block units from the integration unit 307. The added value of the calculated absolute values is output to the average calculator 502.

The average calculator 502 calculates the average value of the integral values by dividing the added value of the absolute values of the integral values corresponding to the respective bits of the sub information as the output from the full adder 501 by the bit count (320 bits in this example) of the sub information. The calculated average value is output to the comparator 503.

The comparator 503 compares the average value of the correlation integral values of the sub information that was integrated for each block, and the pre-stored average threshold. The comparator 503 outputs an error correction timing signal to the error correction unit 309 for instructing the implementation of the error correction if the average value is greater than the average threshold. The error correction unit 309 implements the error correction of the sub information when the error correction timing signal is input from the error correction control unit 308.

Under normal circumstances, the greater the value of the correlation integral value, it could be said that the sub information can be detected stably. This is because the size of the correlation integral value itself is the signal component of the sub information signal, and it goes without saying that the sub information can be reproduced stably if the signal component is large. The error correction control unit 308 determines the detection accuracy of the sub information based on the average value of the integral values. An average threshold that enables the error correction to function sufficiently according to the detection result of the sub information or which sufficiently lowers the erroneous correction probability is set in advance. The error correction control unit 308 is able to perform safe error correction by deciding the start timing of the error correction as a result of determining the detected average value based on a threshold. Note that an erroneous correction refers to information that is different from the original sub information being erroneously subjected to error correction.

Moreover, the average threshold in the first embodiment may be changed according to the integration time (that is, the number of reproduced blocks). Since the integral value increases in proportion to the integration interval, the average threshold may also be set in proportion to the number of blocks that were read.

Note that, although the error correction control unit 308 of the first embodiment decides the timing of implementing the error correction based on the average value of the integral value of each detected bit, the present invention is not limited thereto. The error correction control unit 308 may also decide the timing of implementing the error correction by simply using the total value of the absolute values of the integral value of each bit without dividing it with the bit count. The total value is substantially equal to the average value, and to determine the error correction timing based on the total value falls within the scope of the present invention.

As described above, in the first method, the error correction control unit 308 calculates the total value or the average value of the integral value of each bit of sub information, and determines the reproduction accuracy based on the calculated total value or average value. Moreover, the error correction control unit 308 calculates the total value or the average value of the integral value of each bit of sub information, and determines whether the calculated total value or average value is greater than a predetermined threshold. If the error correction control unit 308 determines that the total value or average value is greater than the predetermined threshold, it instructs the error correction unit 309 to perform the error correction.

Figure 6:
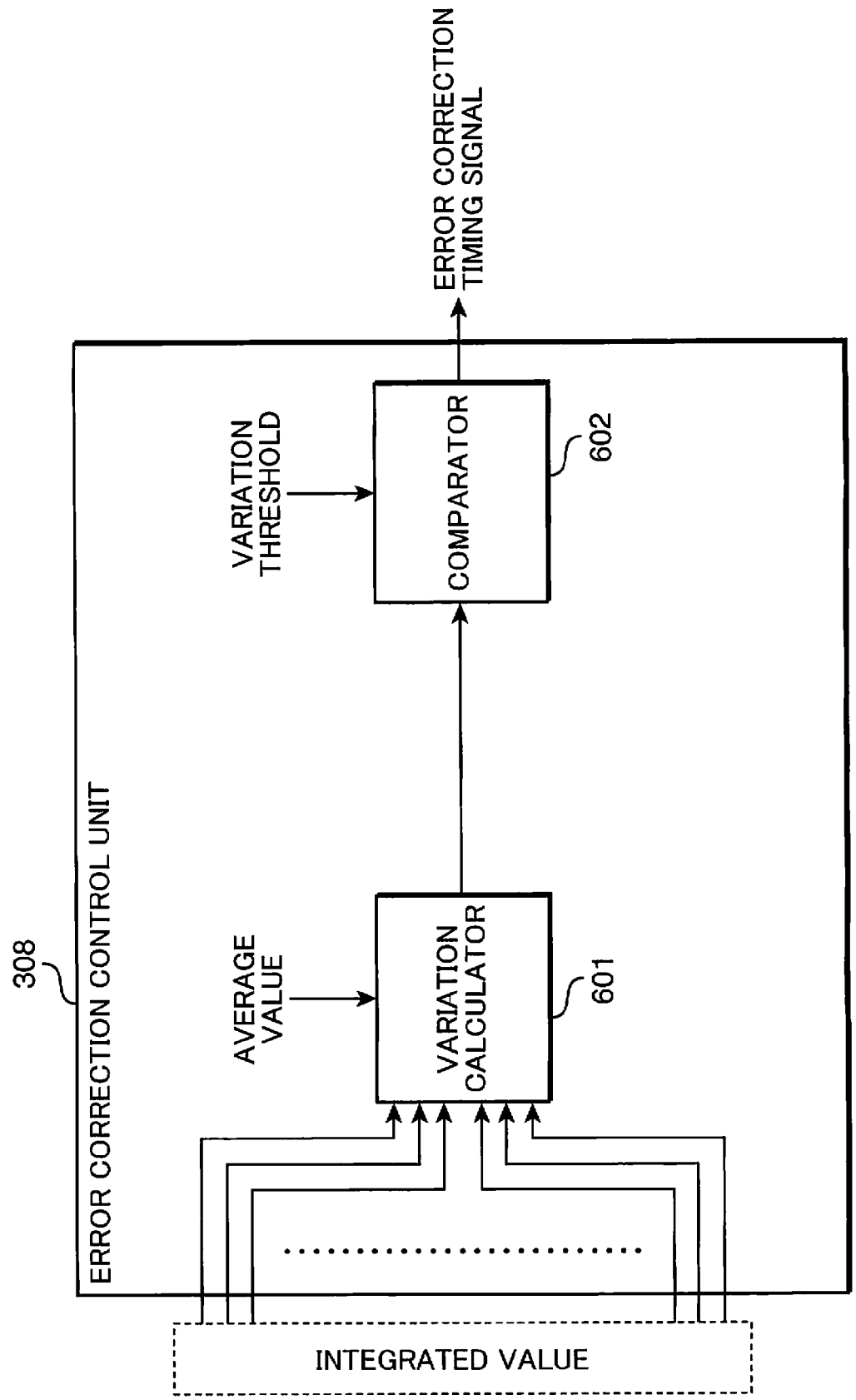
FIG. 6 is a block diagram showing the detailed configuration of the error correction control unit for deciding the timing of performing the error correction based on the second method in the first embodiment of the present invention.

The second method of determining whether to implement the error correction is now explained. FIG. 6 is a block diagram showing the detailed configuration of the error correction control unit for deciding a timing of performing the error correction based on the second method in the first embodiment of the present invention. The second method decides the timing of performing the error correction by determining the variation of the integral value of each detected bit based on a threshold.

The error correction control unit 308 is configured from a variation calculator 601 and a comparator 602.

The variation calculator 601 calculates the variation for each integral value corresponding to the respective bits of the sub information output from the integration unit 307. The variation calculator 601 calculates the standard deviation (or variance) of the integral value, and calculates, as the variation, the value obtained by dividing the absolute value average of the integral values by the standard deviation. This variation index becomes smaller on the root side as the integration interval becomes longer, and the reproduction accuracy of the sub information is thereby improved. The variation is calculated when the reproduction in block units if complete and the integration of all bits of the sub information is complete as with the calculation of the average value of FIG. 5. The calculated variation is output to the comparator 602.

The comparator 602 compares the variation calculated with the variation calculator 601 and the variation threshold that is internally retained in advance. The comparator 602 output an error correction timing signal to the error correction unit 309 for instructing the implementation of the error correction if the variation is smaller than the variation threshold since the sub information reproduction accuracy is high.

Note that a variation threshold that enables the error correction to function sufficiently according to the detection result of the sub information or which sufficiently lowers the erroneous correction probability is set in advance. The error correction control unit 308 is able to perform safe error correction by deciding the start timing of the error correction as a result of determining the calculated variation based on a threshold.

As described above, the error correction processing is only implemented when the variation becomes smaller than the variation threshold as a result of continuously performing integration until the variation of the integral value become small; that is, until the reproduction accuracy of the sub information becomes high. The effect of the error correction processing is thereby yielded, and the erroneous correction probability can be reduced.

As a result of calculating the variation, the second method is able to improve the reading accuracy of the sub information in comparison to the first method that only uses the average value explained with reference to FIG. 5.

As described above, in the second method, the error correction control unit 308 calculates the variation of the integral value for each bit of the sub information, and determines the reproduction accuracy based on the calculated variation. Moreover, the error correction control unit 308 calculates the variation of the integral value for each bit of the sub information, and determines whether the calculated variation is smaller than a predetermined threshold. Moreover, if the error correction control unit 308 determines that the variation is smaller than the predetermined threshold, it instructs the error correction unit 309 to perform the error correction.

Figure 7:
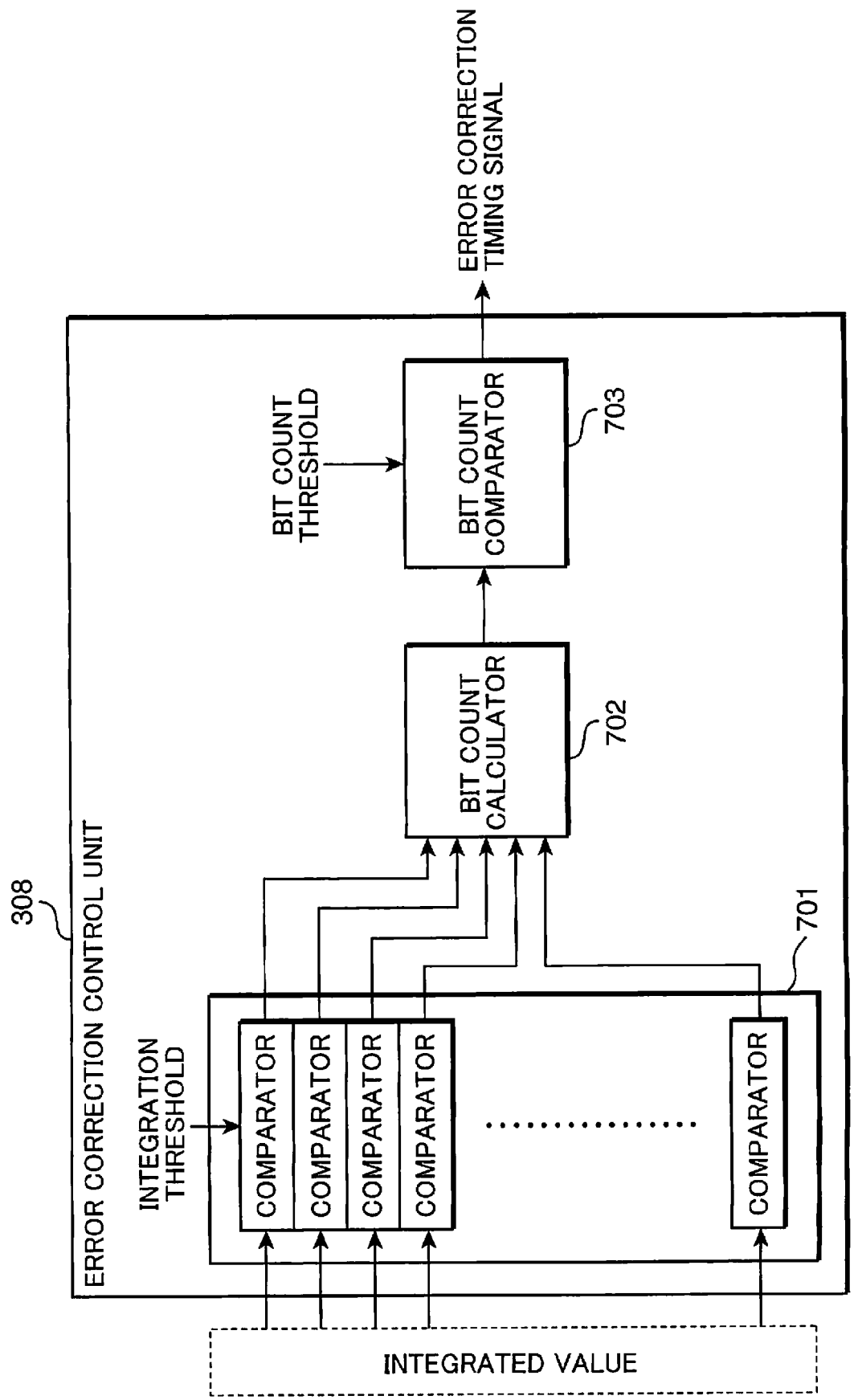
FIG. 7 is a block diagram showing the detailed configuration of the error correction control unit for deciding the timing of performing the error correction based on the third method in the first embodiment of the present invention.

The third method of determining whether to implement the error correction is now explained. FIG. 7 is a block diagram showing the detailed configuration of the error correction control unit for deciding a timing of performing the error correction based on the third method in the first embodiment of the present invention. The third method decides the timing of performing the error correction by determining the integral value of each detected bit based on a threshold.

The error correction control unit 308 is configured from a comparator 701, a bit count calculator 702 and a bit count comparator 703.

The comparator 701 compares the integral value corresponding to one bit of the sub information output from the integration unit 307 with the pre-stored integral threshold for each bit, and outputs the comparative result to the bit count calculator 702. Note that the error correction control unit 308 comprises the same number of comparators 701 as the bit count (320 in the first embodiment) of the sub information. The comparator 701 may be configured to compare the absolute value of the integral value with the integral threshold, or configured to pre-store a positive integral threshold and a negative integral threshold, and perform the comparison using the positive integral threshold if the integral value is positive and perform the comparison using the negative integral threshold if the integral value is negative.

The bit count calculator 702 calculates the bit count in which the integral value was determined to be greater (or smaller) than the integral threshold by the comparator 701, and outputs this to the bit count comparator 703.

Specifically, the comparator 701 determines whether the integral value of the respective bits output from the integration unit 307 exceeds the integral threshold, and the bit count calculator 702 counts the number of integral values that were determined to be exceeding the integral threshold by the comparator 701.

The bit count comparator 703 compares the pre-set bit count threshold and the bit count that was calculated with the bit count calculator 702. The bit count comparator 703 outputs an error correction timing signal to the error correction unit 309 for instructing the implementation of the error correction if the calculated bit count is smaller than the bit count threshold.

Note that the value of the bit count threshold is desirably set according to the correctable bit count based on the error correction encoding of the sub information. The probability that the sub information can be reproduced safely will increase by setting the value of the bit count threshold to be smaller than the error correctable bit count. Moreover, as with the first embodiment, in the case of error correction encoding which performs correction in byte units such as with the Reed-Solomon code, desirably, the bit count calculator 702 performs the calculation of bit units in byte units to calculate the byte count, and the bit count comparator 703 compares the pre-set byte count threshold and the byte count that was calculated with the bit count calculator 702. Moreover, the byte count threshold in the foregoing case is also desirably set based on the correctable byte count that can be corrected with the Reed-Solomon code as with the bit count threshold.

The error correction control unit 308 explained with reference to FIG. 5 to FIG. 7 above estimates the reading accuracy of the sub information based on the average value or variation of the integral values, and outputs an error correction timing signal to the error correction unit 309 for implementing the error correction processing when the effect of error correction is expected or when the erroneous correction probability is estimated to be sufficiently low. Consequently, it is possible to reduce the probability of implementing the error correction processing in an interval where the integral quantity is insufficient, or induce erroneous correction that has substantially no error correction processing effect.

Note that, in the first embodiment, the optical disk reproduction apparatus 1 corresponds to an example of the optical disk reproduction apparatus, the reproduction processing device 3 corresponds to an example of the reproduction processing device, the sub information extraction unit 2 corresponds to an example of the sub information extraction unit, the main information extraction unit 4 corresponds to an example of the main information extraction unit, the error correction control unit 308 corresponds to an example of the reproduction accuracy determination unit and the error correction timing control unit, and the error correction unit 309 corresponds to an example of the error correction unit.

Figure 8:
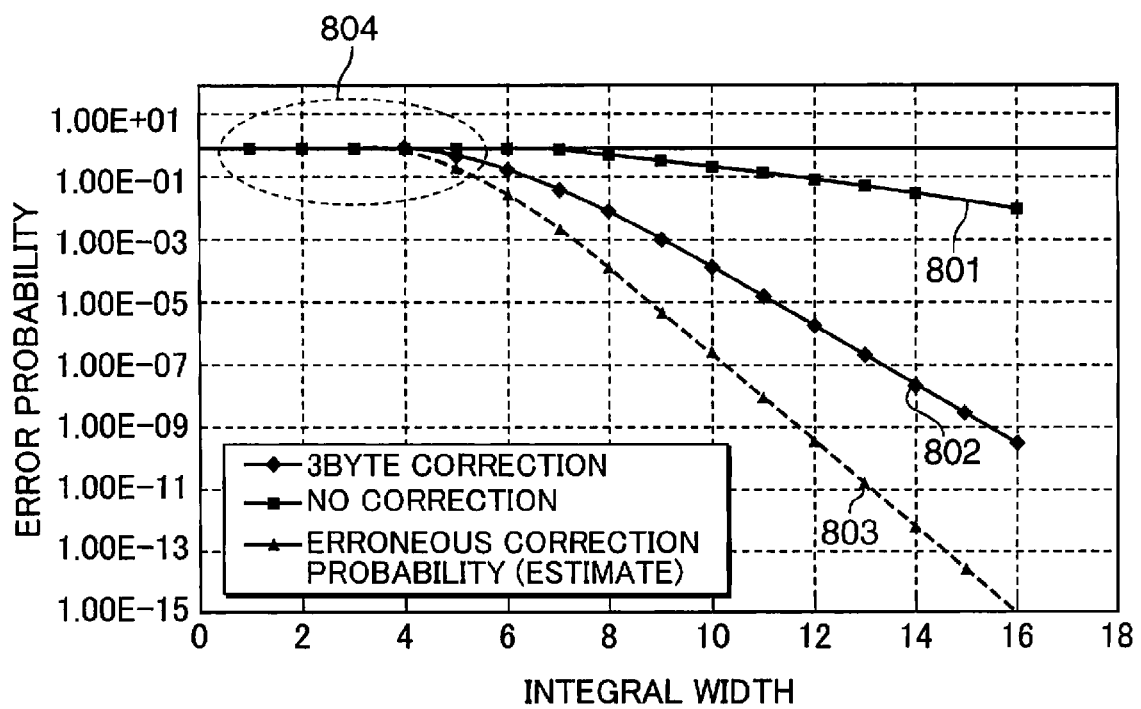
FIG. 8 is a graph showing the simulation results of the integral width of the sub information and the error probability and erroneous correction probability of the sub information in the first embodiment of the present invention.

FIG. 8 is a graph showing the simulation results of the integral width (number of blocks) of the sub information and the error probability and erroneous correction probability of the entire 320 bit sub information in the first embodiment of the present invention.

In FIG. 8, the horizontal axis shows the number of blocks as the integral width, and the vertical axis shows the error probability and the erroneous correction probability. In the first embodiment, the first embodiment shows the simulation results when the signal component and the noise component are basically the same after implementing the integration of one block. Moreover, the graph shown in FIG. 8 shows a case of reproducing the sub information that has been subjected to error correction encoding with a 320 bit (40 byte) Reed-Solomon code, and shows a case of the error correction encoding of the RS (40, 32, 9) configured from 32 byte information and 8 byte parity.

The error probability 801 shows the probability of correctly reading the 40 byte sub information in all bytes without performing error correction.

The error probability 802 shows the probability of correctly reading the sub information as a result of performing error correction of 3 bytes or less based on the Reed-Solomon code. Needless to say, the error probability 802 decreases in comparison to the error probability 801 in which the error correction is not performed.

The erroneous correction probability 803 shows the probability of correcting a different code as a result of the error correction. Note that the erroneous correction probability 803 shown in FIG. 8 is an estimate. If an erroneous correction occurs, the error correction processing will end normally, but it will mean that the recorded sub information was read correctly, and if an encryption key of the main information is recorded as the sub information, the main information cannot be reproduced.

Moreover, the zone 804 surrounded with a dotted line shows the zone where the effect of the error correction is low and the erroneous correction probability is high. Specifically, in this example, even if integration is performed up to the fourth block, there is hardly any difference between the error probability 801 in the case of not performing the error correction and the error probability 802 in the case of performing the error correction, and in either case the error probability is high. In addition, the probability of erroneous correction of correcting a different code as a result of performing the error correction is extremely high, and the error correction processing should not be performed.

Figure 9:
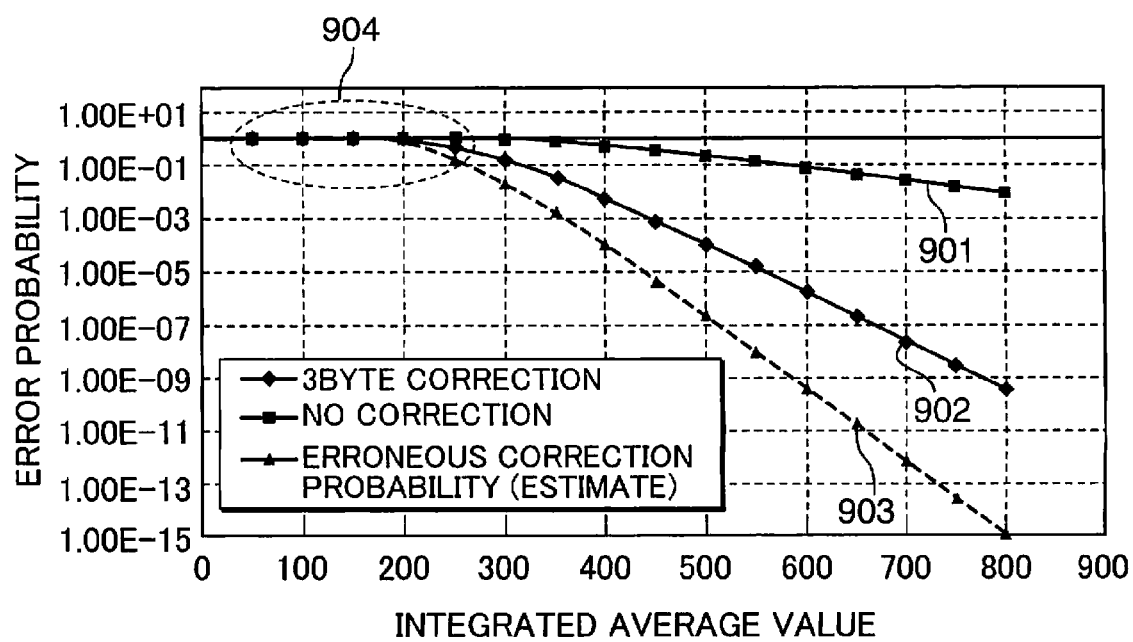
FIG. 9 is a graph showing the simulation results of the integrated average value and the error probability and erroneous correction probability of the sub information in the first embodiment of the present invention.

FIG. 9 is a graph showing the simulation results of the integrated average value (absolute value average) and the error probability and erroneous correction probability of the sub information in the first embodiment of the present invention.

As with FIG. 8, the graph shown in FIG. 9 shows the error probability 901 in the case of not performing the error correction, the error probability 902 in the case of performing the error correction of 3 bytes or less, and the erroneous correction probability 903. Moreover, in FIG. 9, the horizontal axis shows the integrated average value, and the vertical axis shows the error probability and the erroneous correction probability.

Under normal circumstances, if the same sub information is recorded, the integration interval and the integrated average value are of a proportionate relationship, and if the integration interval is doubled, the integrated average value as the signal component of the sub information will also double.

As shown in the graph, if the integral value is extremely small in the integration interval (zone 904) of the fourth block or lower, the error correction effect is also low, and the probability of the erroneous correction is contrarily high. Accordingly, in this example, the error correction effect can be increased and the erroneous correction probability can be reduced by not performing the error correction in the zone 904 in which the integrated average value is less than 200, and only performing the error correction when the integrated average value becomes 200 or greater.

Figure 10:
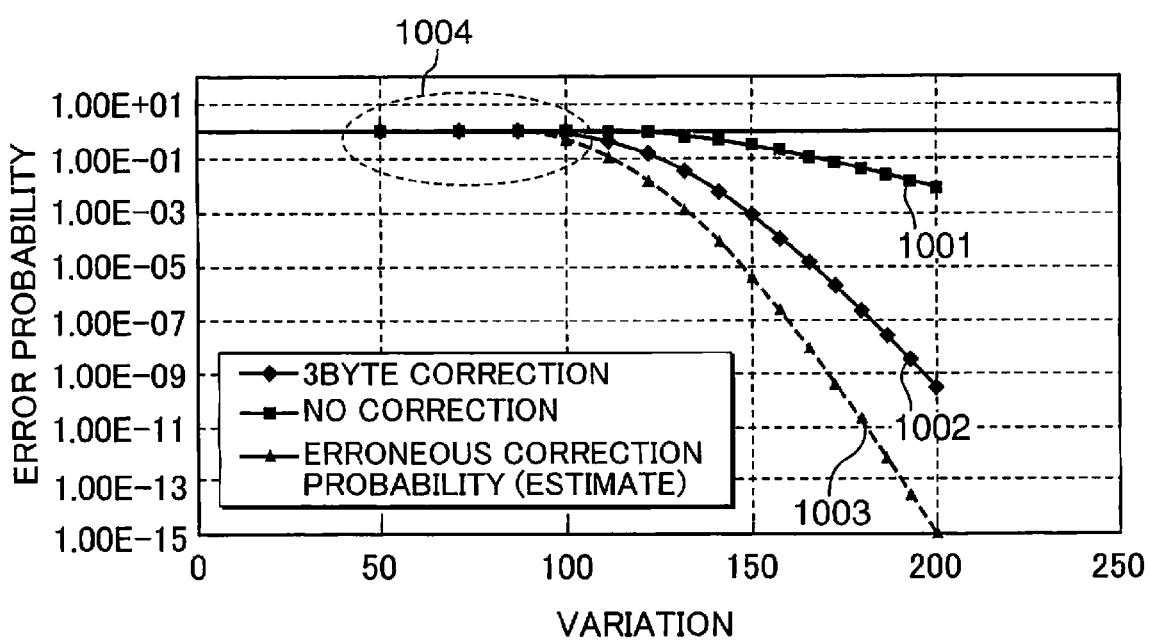
FIG. 10 is a graph showing the simulation results of the variation and the error probability and erroneous correction probability of the sub information in the first embodiment of the present invention.

FIG. 10 is a graph showing the simulation results of the variation (standard deviation) and the error probability and erroneous correction probability of the sub information in the first embodiment of the present invention.

As with FIG. 8 and FIG. 9, the graph shown in FIG. 10 shows the error probability 1001 in the case of not performing the error correction, the error probability 1002 in the case of performing the error correction of 3 bytes or less, and the erroneous correction probability 1003. Moreover, in FIG. 10, the horizontal axis shows the variation, and the vertical axis shows the error probability and the erroneous correction probability.

As shown in this example, on the assumption that the noise component in relation to the signal component in the sub information detection is only white noise, if the integration interval is doubled, the noise component is multiplied by $\sqrt{2}$, and, in summary, if the integration interval is doubled, the noise component SIN in relation to the signal component will be $1/\sqrt{2}$. This shows that the reading accuracy of the sub information will improve as the integration interval becomes longer.

In this example, in the zone 1004 where the variation is less than 100, not only is the error correction effect low, the erroneous correction probability is high, and it is desirable to not perform the error correction in the zone 1004.

As shown with the simulation results of FIG. 9 and FIG. 10, it is possible to estimate the reading accuracy of the sub information based on the average of the integral values, variation, or integral value for each bit. Moreover, if it is determined that the error correction effect is high and the erroneous correction probability is sufficiently low, the sub information can be read safely by controlling the timing of performing the error correction so as to implement such error correction. Moreover, even if the error correction is implemented in a zone in which the reading accuracy of the sub information is low, the error correction effect is low. Thus, as a result of preventing the error correction from being implemented in such a zone in which the reading accuracy of the sub information is low, reduction of the power consumption of the optical disk reproduction apparatus can be simultaneously achieved.

Moreover, desirably, the respective thresholds (average threshold, variation threshold and bit count threshold) of the first embodiment are derived based on the relation between the integral value and the error probability of the sub information. Moreover, desirably, the respective thresholds are decided by being associated with the error correction encoding method of the sub information, and the bit count or byte count that is correctable in the error correction system.

Note that, although the first embodiment records the sub information based on whether the frame identifying information part of the synchronization code is to be altered, the present invention is not limited thereto.

For example, the sub information can also be recorded based on the displacement of the recording mark edge in the tangential direction (modification of the recording mark if the direction of displacement is changed in the recording mark), or the displacement of the recording mark in the radial direction (modification of the recording mark if the direction of the displacement is changed in the recording mark) (for example, refer to Japanese Patent Application Laid-open No. 2001-357533). Even with this kind of sub information recording method, the correlation integral of the correlation signal generated with the pseudo random number series and the signal that detected the displacement of the recording mark is calculated, and the sub information is thereby reproduced. If the sub information has been subjected to error correction encoding, the error correction control unit 308 is able to set a safe error correction timing as with the first embodiment.

Moreover, as other sub information recording methods, methods such as recording the sub information by altering the modulation pattern of the main information, or intentionally assigning an error to the main information that has been subjected to error correction encoding and recording the sub information based on the location of such error bit or the pattern of such error bit.

The gist of the present invention is to reproduce the sub information based on integral detection, and control the timing of implementing the error correction of the sub information that has been subjected to error correction encoding according to the integral value in the reproduction of the sub information in which the detection accuracy of such sub information will increase as the integration interval becomes longer pursuant to the integral effect. As the sub information recording method, so as long as the sub information is recorded based on alteration of a predetermined pattern of data recorded in the pattern with the recording mark, modification of the recording mark, and displacement of the recording mark, all recording methods fall within the scope of the present invention.

Figure 11:
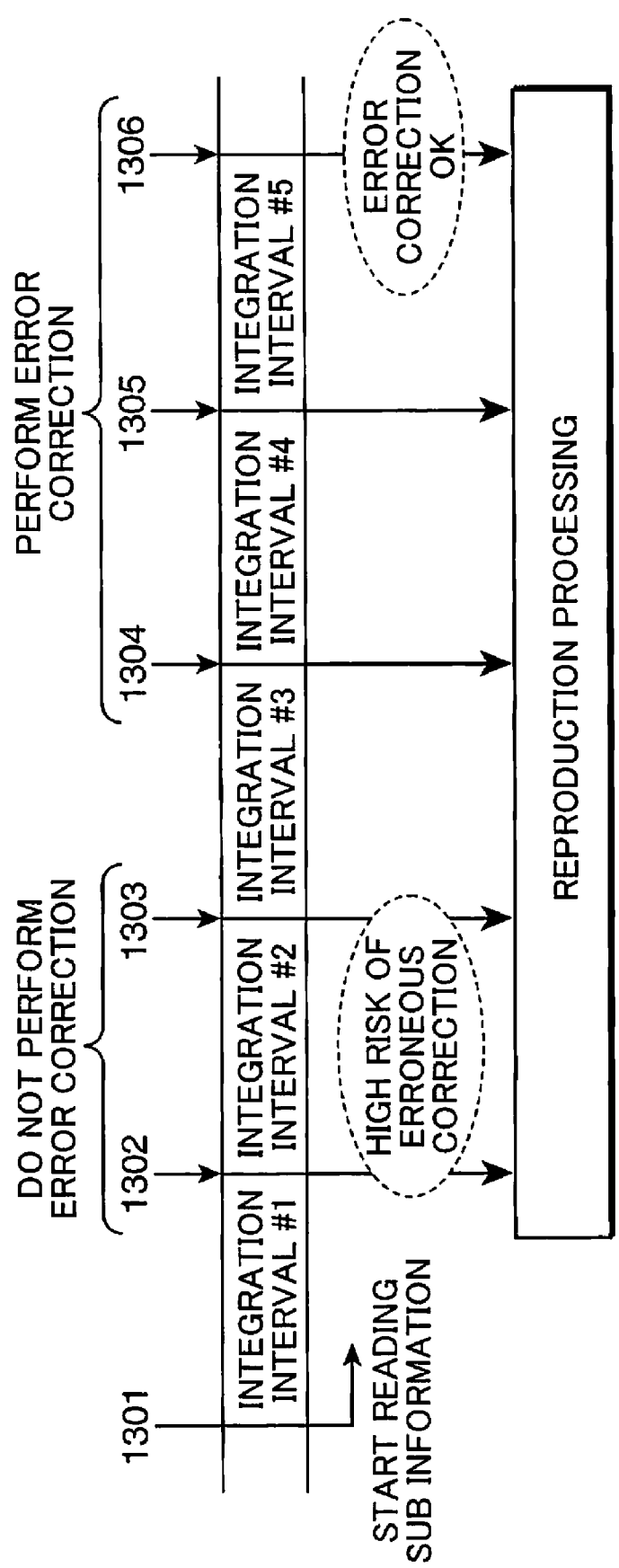
FIG. 11 is a conceptual diagram explaining the method of controlling the error correction timing of the sub information in the optical disk reproduction apparatus according to the first embodiment of the present invention.
Figure 12:
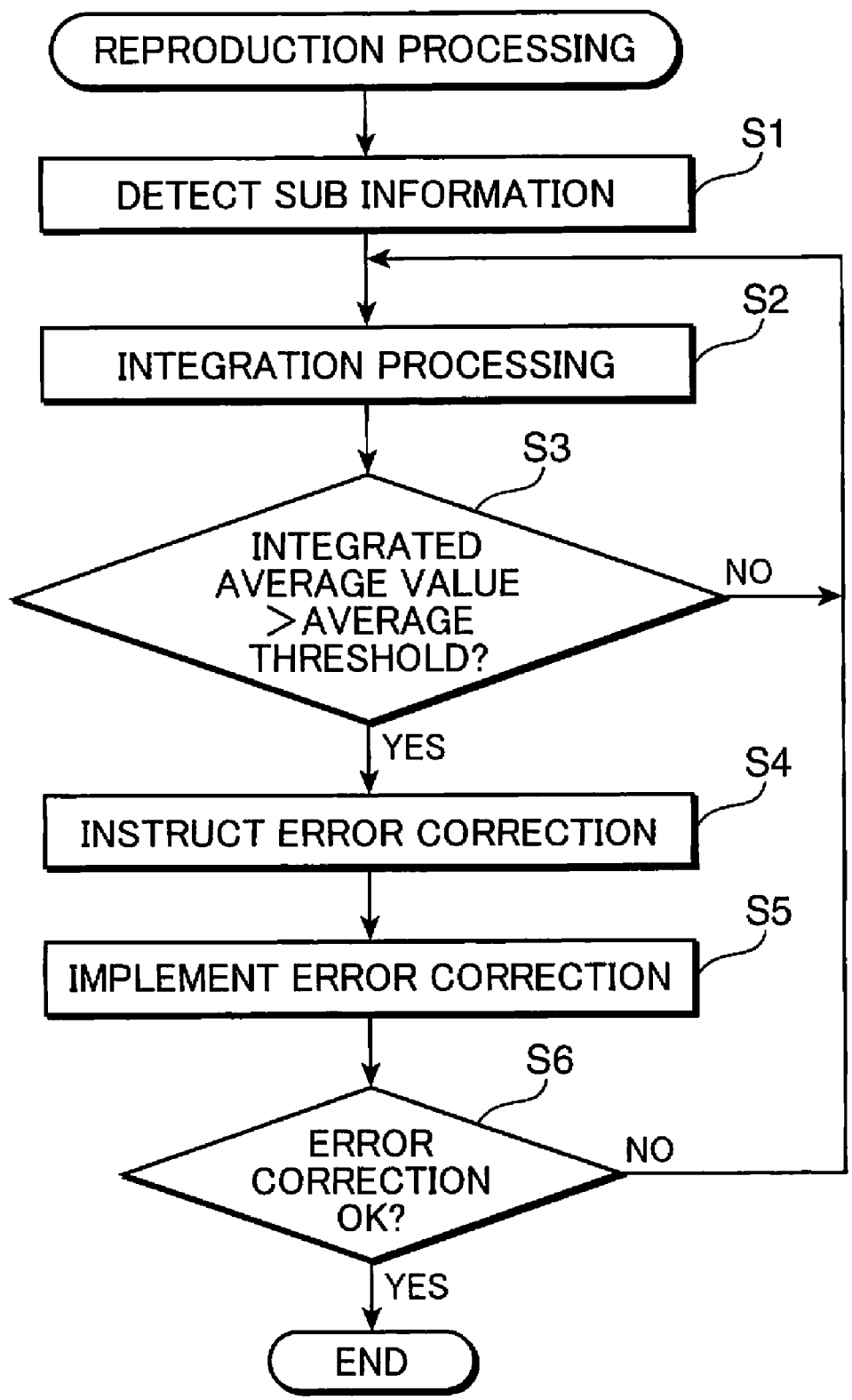
FIG. 12 is a flowchart showing the reproduction processing of the sub information in the optical disk reproduction apparatus according to the first embodiment of the present invention.

FIG. 11 is a conceptual diagram explaining the method of controlling the error correction timing of the sub information in the optical disk reproduction apparatus according to the first embodiment of the present invention. FIG. 12 is a flowchart showing the reproduction processing of the sub information in the optical disk reproduction apparatus according to the first embodiment of the present invention.

Foremost, the sub information detection unit 305 controls the reading timing of the sub information based on the address signal from the formatter 303 and the frame location information from the frame location detection unit 304 and, upon determining that the target zone for reading the sub information has been reached, starts the sub information detection operation (step S1). In the example shown in FIG. 11, the sub information detection unit 305 starts the integration for detecting the sub information from the top location 1301 of the integration interval #1. Moreover, in this example, the integration intervals #1 to #5 are consecutively disposed in the circumferential direction of the optical disk, and the integration interval is synchronized with the ECC block to which the main information has been subjected to error correction encoding, or a second with address information.

Subsequently, the integration unit 307 integrates the correlation value of the detection signal from the sub information detection unit 305 and the correlation signal from the correlation signal generation unit 306 (step S2). Subsequently, the error correction control unit 308 determines whether the integrated average value is greater than the average threshold each time the integration of one integration interval is complete (step S3). The error correction control unit 308 determines whether to implement the error correction of the sub information with the error correction unit 309 by determining whether the integrated average value is greater than the average threshold. Note that the error correction control unit 308 may also determine whether the implement the error correction of the sub information with the error correction unit 309 by determining whether the variation of the integral values is smaller than a predetermined threshold.

If it is determined that the integrated average value is smaller than the average threshold; that is, if it is determined that the error correction is not to be implemented (NO at step S3), the routine returns to the processing of step S2, and the integration unit 307 continues the reproduction processing, and performs the integration of the sequential and subsequent integration interval.

Meanwhile, if it is determined that the integrated average value is greater than the average threshold; that is, if it is determined that the error correction is to be implemented (YES at step S3), the error correction control unit 308 instructs the error correction unit 309 to perform the error correction (step S4). Subsequently, the error correction unit 309 implements the error correction of the sub information (step S5).

Subsequently, the error correction unit 309 determines whether the error correction was normally performed by determining whether there is an error bit of the sub information as a result of implementing the error correction (step S6). Here, if it is determined that there is no error bit; that is, if it is determined that the error correction was performed normally (YES at step S6), since this means that the detection of the sub information was successful, the reproduction processing is ended, and the error correction unit 309 outputs the detected sub information.

Meanwhile, if it is determined that there is an error bit; that is, if it is determined that the error correction was not performed normally (NO at step S6), the routine returns to the processing of step S2, and the integration unit 307 performs the integration of the sequential and subsequent integration interval.

In the example shown in FIG. 11, the detection accuracy of the sub information is extremely low in the end location 1302 of the integration interval #1 and the end location 1303 of the integration interval #2, and shows that it is a zone with a high risk where information that is different from the original sub information may be subjected to erroneous correction as a result of performing the error correction processing. Moreover, although the risk of erroneous correction is low in the end location 1304 of the integration interval #3 and the end location 1305 of the integration interval #4 even if the error correction processing is performed, the detection accuracy of the sub information is still low, and shows that the error correction may not be performed correctly. Moreover, the end location 1306 of the integration interval #5 shows that the error correction was successful and the reproduction processing is ended.

Accordingly, the error correction control unit 308 does not perform the error correction at a timing where the possibility of erroneous correction will increase as a result of performing error correction such as to the end location 1302 and the end location 1303, and perform the error correction at the timing of the end location 1304, the end location 1305 and the end location 1306 in which the possibility of erroneous correction is determined to be low as a result of the integral detection.

Consequently, even with an optical disk in which the recording quality of the sub information is low, it is possible to reduce the risk of erroneous correction, and, with an optical disk in which the recording quality of the sub information is high, the error correction can be performed at a fast timing, and it is possible to dynamically deal with two contradicting demands.

(Second Embodiment)

Figure 13:
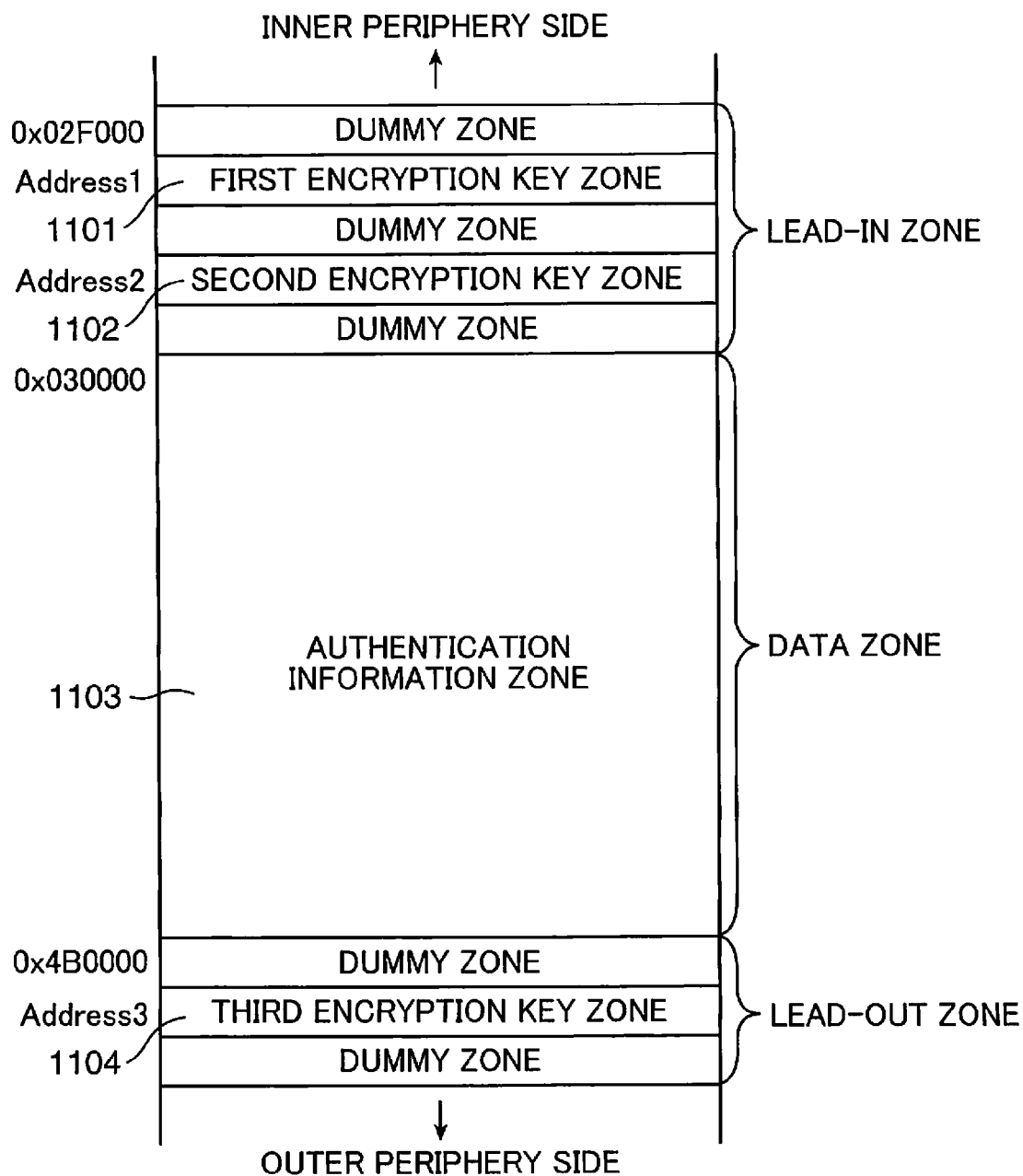
FIG. 13 is a conceptual diagram showing the recording format of the sub information in the second embodiment of the present invention.

FIG. 13 is a conceptual diagram showing the recording format of the sub information in the second embodiment of the present invention. In the second embodiment, a case where the optical disk is a DVD-ROM is shown. The optical disk includes a lead-in zone as an inner peripheral side control data zone from the sector address "0x02F000" onward, a data zone as the user data zone of the sector address "0x030000" onward, and a lead-out zone as the outer periphery side control data zone of the sector address "0x4B0000" onward.

In the second embodiment, as with the first embodiment, contents information and management information required for the reproduction of the contents information are recorded as main information by a concave and convex recording mark sequence being formed in the circumferential direction of the optical disk. Moreover, the main information is modulated and recorded in a plurality of ECC block units that has been subjected to error correction encoding, the respective blocks include a plurality of sectors to which a sector address is assigned, and the respective sectors include a plurality of frames to which a synchronization code required for the frame synchronization is assigned. Moreover, the synchronization code is configured from a synchronizing part as a fixed pattern showing that it is a synchronization code, and a frame identifying information part showing the frame location in the sector. Moreover, the sub information of the second embodiment is also recorded based on whether the frame identifying information in the synchronization code has been altered from the normal pattern.

The optical disk of the second embodiment is recorded with an encryption key that is required for decoding the encoded contents information, and authentication information showing whether it is an illegally copied optical disk as the sub information.

As shown in FIG. 13, the optical disk of the second embodiment is recorded with an encryption key of the contents information by altering the pattern of the frame identifying information part of the main information in the lead-in zone and the lead-out zone as the inner periphery and outer periphery control data zones. Moreover, the authentication information is recorded by altering the pattern of the frame identifying information part of the main information in the data zone.

The lead-in zone and the lead-out zone are recorded with encryption keys in a plurality of locations from the address location that is predetermined for each optical disk. In this example, the first encryption key zone 1101 is provided to the "Address1" of the lead-in zone, the second encryption key zone 1102 is provided to the "Address2" of the lead-in zone, and the third encryption key zone 1104 is provided to the "Address3" of the lead-out zone.

The first encryption key zone 1101 is recorded with a first encryption key for decoding the first contents information that is recorded in the data zone. The second encryption key zone 1102 is recorded with a second encryption key for decoding the second contents information that is recorded in the data zone. The third encryption key zone 1104 is recorded with a third encryption key for decoding the third contents information that is recorded in the data zone. Note that the first contents information, the second contents information and the third contents information are respectively different pieces of information.

The "Address1" to the "Address3" are set arbitrarily for each stamper disk that is used for creating the ROM disk. The fact that an encryption key is recorded as the sub information in the "Address1" to the "Address3" is recorded, for example, as the main information by being encrypted different from the contents information in the inner periphery or outer periphery control data zone.

Moreover, even in the zones in which the encryption key and authentication information are not recorded as the sub information in the lead-in zone, the lead-out zone and the data zone, a dummy zone in which the pattern of the frame identifying information part is randomly altered is set. Consequently, in comparison to cases where the frame identifying information part is altered only in specified zones, it is possible to reduce the risk of the zone recorded with the sub information being discovered by a malicious third party.

Note that the sub information of the second embodiment may be recorded, as with the first embodiment, based on the displacement of the recording mark recording the main information, modification of the recording mark, or alteration of the pattern. In the foregoing case also, as a result of randomly displacing the recording mark, modifying the recording mark or altering the pattern of the data that is recorded in a predetermined pattern with a recording mark in the dummy zone, the zone recorded with the sub information cannot be discovered easily.

Moreover, in the second embodiment, it is possible to simultaneously read the authentication information upon accessing user data such as the contents information by recording the authentication information in the data zone as the sub information. Specifically, the data zone is provided with an authentication information zone 1103 for recording the authentication information. The authentication information is information for determining whether to reproduce the contents information read from the data zone. It is thereby possible to determine whether the optical disk is a legitimate disk recorded with the authentication information.

Under normal circumstances, since the frame identifying information part is not data showing the contents information, it is never output from the optical disk reproduction apparatus. Accordingly, even if an attempt is made to illegally duplicate the reproduced data of the optical disk, the sub information cannot be duplicated since the frame identifying information part does not exist in the reproduced data.

Accordingly, when the contents information of the data zone is reproduced, if the authentication information is not detected as the sub information, the optical disk reproduction apparatus stops the reproduction operation or ejects the optical disk itself from the optical disk reproduction apparatus since an unauthorized optical disk has been loaded. It is thereby possible to protect the copyright of the contents information recorded on the optical disk.

If only the encryption key information is recorded in the control data zone and the authentication information is not recorded in the data zone as with the second embodiment, even in cases where a legitimate optical disk is loaded in the optical disk reproduction apparatus in advance and the optical disk reproduction apparatus is started and the encryption key is read as the sub information, and a fraudulent act of switching the disk to an illegally copied optical disk to which the sub information has not been copied is performed, there was a problem in that the illegally copied optical disk would be reproduced. Nevertheless, if the authentication information is recorded as the sub information in the data zone as with this example, it is possible to resist fraudulent acts of switching to an illegally copied optical disk midway since the authentication information can be confirmed each time the contents information is accessed.

Moreover, even in cases where the sub information is recorded in the specified zone, if the sub information is confirmed every given period, it is possible to detect the switching to an illegally copied optical disk. Nevertheless, if the reading location of the contents information and the specified zone recorded with the sub information are separated at the inner periphery side and the outer periphery side, the optical head must move to the specified zone and thereafter return to the reading location of the contents information. Thus, the overhead during the access will increase. Meanwhile, this example yields the effect of being able to eliminate the overhead since the authentication information can be read from the reading location of the contents information.

Figure 14:
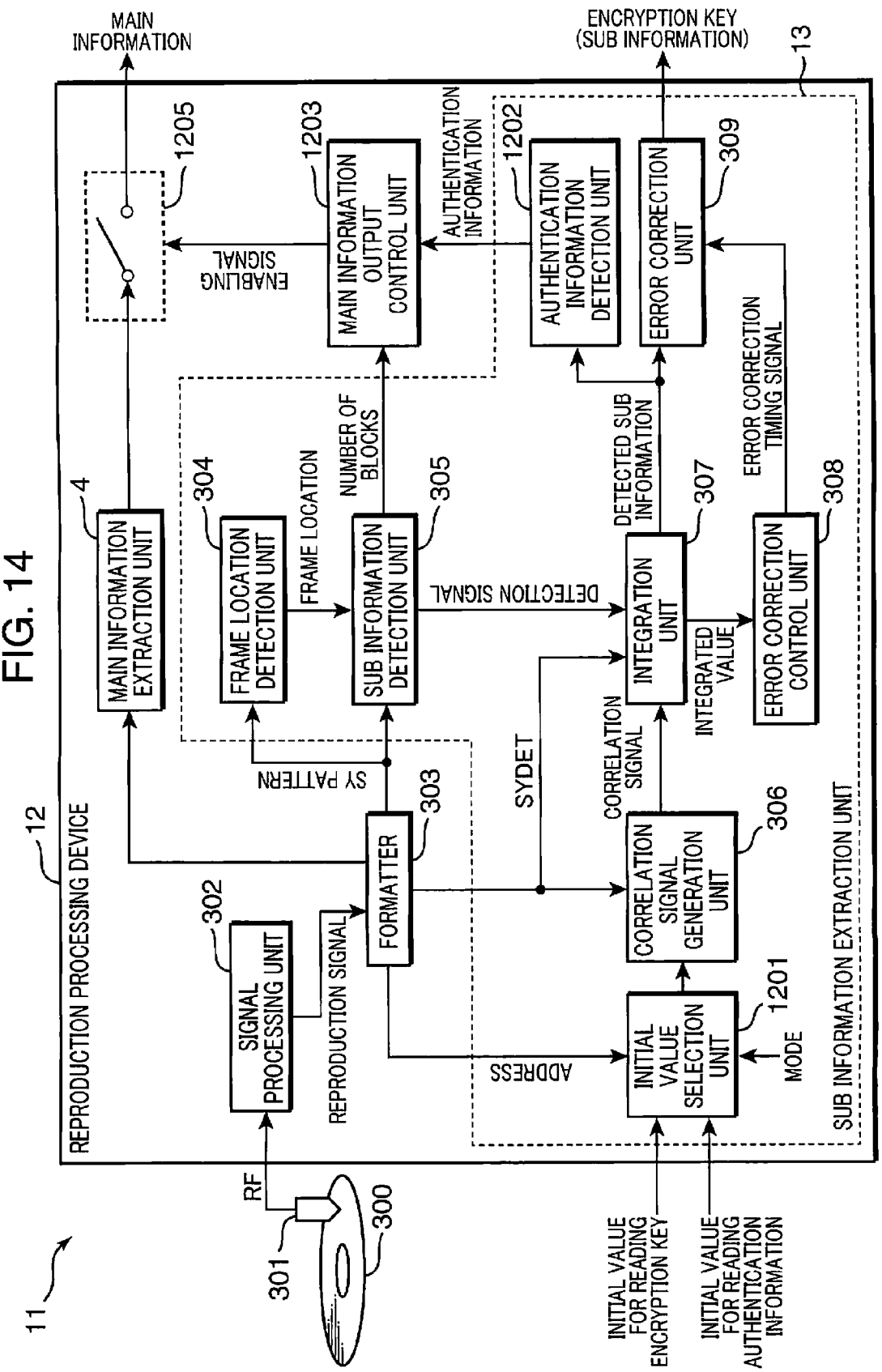
FIG. 14 is a block diagram showing the configuration of the optical disk reproduction apparatus in the second embodiment of the present invention.

FIG. 14 is a block diagram showing the configuration of the optical disk reproduction apparatus in the second embodiment of the present invention. Note that the same reference numeral is given to the configuration that is common with the optical disk reproduction apparatus of the first embodiment shown in FIG. 3, and the explanation thereof is omitted.

The optical disk reproduction apparatus 11 of the second embodiment reproduces information recorded on the optical disk 300, and comprises an optical head 301 and a reproduction processing device 12. The reproduction processing device 12 processes a reproduction signal including the main information and the sub information read based on the recording mark formed on the optical disk 300. The reproduction processing device 12 comprises a main information extraction unit 4, a sub information extraction unit 13, a signal processing unit 302, a formatter 303, a main information output control unit 1203 and a switch 1205.

The sub information extraction unit 13 extracts the sub information from the reproduction signal. The sub information extraction unit 13 comprises a frame location detection unit 304, a sub information detection unit 305, a correlation signal generation unit 306, an integration unit 307, an error correction control unit 308, an error correction unit 309, an initial value selection unit 1201 and an authentication information detection unit 1202. Note that the reproduction processing device 12 of the second embodiment is configured by the initial value selection unit 1201, the authentication information detection unit 1202, the main information output control unit 1203 and the switch 1205 being added to the reproduction processing device 3 of FIG. 3.

The initial value selection unit 1201 selects the initial value to be used by the correlation signal generation unit 306 upon reproducing an encryption key as the sub information or reproducing authentication information as the sub information. The correlation signal generation unit 306 is configured from an LFSR that generates a pseudo random number series such as the M series or the Gold code as explained in the first embodiment. The initial value selection unit 1201 selects the initial value to be set in the LFSR. The initial value selection unit 1201 selects the initial value for reading the encryption key that is input from the outside upon reading an encryption key as the sub information, and selects the initial value for reading the authentication information upon reading authentication information as the sub information, and outputs this to the correlation signal generation unit 306.

With respect to the method of determining whether to select which initial value; namely, the initial value for reading the encryption key or the initial value for reading the authentication information, the initial value selection unit 1201 selects the initial value for reading the encryption key if the address information shows a control data zone or the address information is the address information for reading an encryption key according to the sector address that is output from the formatter 303, and selects the initial value for reading the authentication information if the address information is a data zone.

Moreover, either the encryption key reading mode or the authentication information reading mode may be input as the mode from the system controller of the reproduction processing device 12 not shown, and this may be used to select the initial value. Specifically, the initial value selection unit 1201 selects the initial value for reading the encryption key if the encryption key reading mode is input from the system controller, and selects the initial value for reading the authentication information if the authentication information reading mode is input from the system controller.

The authentication information detection unit 1202 detects the authentication information based on the detected sub information output from the integration unit 307. The authentication information may be subjected to error correction encoding as with the sub information of the first embodiment, or may only be 1 bit authenticity information. If the authentication information is 1 bit authenticity information, the authentication information detection unit 1202 uses one integrator of the integration unit 307 and determines the integral value of that integrator based on a threshold, and thereby extracts the authentication information. Specifically, the integration unit 307 detects the correlation of the correlation signal from the correlation signal generation unit 306 and the detection signal from the sub information detection unit 305, and the authentication information detection unit 1202 determines that it is an authentic disk if the integral value as the correlation value is greater than a predetermined threshold, and determines that it is a forged disk if the integral value is smaller than a predetermined threshold. If the authentication information detection unit 1202 determines that it is an authentic disk, it outputs authentication information representing that it is an authentic disk to the main information output control unit 1203, and, if the authentication information detection unit 1202 determines that it is a forged disk, it outputs authentication information representing that it is a forged disk to the main information output control unit 1203.

Moreover, if the authentication information has been subjected to error correction encoding, the authentication information can be subjected to error correction. The authentication information detection unit 1202 determines whether the detected sub information that has been subjected to error correction with the error correction unit 309 is equal to the value that is retained internally in secrecy. The authentication information detection unit 1202 outputs authentication information representing that it is an authentic disk to the main information output control unit 1203 only when it is determined that the detected sub information subjected to error correction is equal to the value that is retained internally in secrecy.

The main information output control unit 1203 creates an enabling signal for enabling the reproduction of the main information according to the authentication information from the authentication information detection unit 1202 and the number of reproduced blocks from the sub information detection unit 305, and outputs this to the switch 1205. The main information output control unit 1203 outputs an enabling signal for enabling the reproduction of the main information only if the authentication information shows that it is an authentic disk and the number of blocks is greater than a given number of blocks.

As explained in the first embodiment, if the integral width is extremely small in the integral detection of the sub information, it is not possible to stably read the sub information. Accordingly, upon implementing reproduction processing to a small zone in the data zone, there is a possibility that the authentication information is not read stably, and, even if legitimate authentication information is recorded on the disk, it may be determined to be an unauthorized disk and the main information may not be reproduced. Thus, the reproduction processing device 12 of the second embodiment implements processing for simultaneously reading the authentication information only when implementing a reproduction operation of a given width or more to the data zone. Thus, the main information output control unit 1203 reproduces the main information regardless of whether the authentication information is detected for access to a data zone that is narrower than a given width. Moreover, the given width is desirably greater than a sufficient zone which enables the stable reading of the authentication information.

The main information extraction unit 4 extracts the main information from the reproduction signal read with the optical head 301. The main information extraction unit 4 implements the error correction of the reproduced data output from the formatter 303 in ECC block units, and thereby extracts the contents information or data that is required for the reproduction of the contents information as the main information.

The switch 1205 outputs the main information extracted with the main information extraction unit 4 only when an enabling signal which enables the reproduction of the main information is output from the main information output control unit 1203.

Moreover, if the authentication information is not detected even if there was access to a data zone of a given width or more, the main information output control unit 1203 stops the output of the main information with the switch 1205, and uses the system controller not shown to eject the disk, output an error message showing that the authentication information cannot be read, or display an error message on a display device not shown connected to the reproduction processing device 12.

Moreover, the main information output from the switch 1205 is decoded with a decoding unit not shown based on the encryption key (sub information) output from the error correction unit 309, and output to the display device not shown.

Note that in the first and second embodiments, the respective functional blocks of the reproduction processing devices 3, 12 are realized as an LSI as a typical integrated circuit.

These may be individually formed as one chip, or formed as one chip to contain a part or all of the above.

Here, although the term "LSI" is used, depending on the degree of integration, it may be referred to as an IC, a system LSI, a super LSI or an ultra LSI.

Moreover, the method of realizing the integrated circuit is not limited to LSI, and it may also be realized with a dedicated circuit or a general-purpose processor. After the manufacture of the LSI, a programmable FPGA (Field Programmable Gate Array), or a reconfigurable processor capable of reconfiguring the connection and setting of the LSI internal circuit cells may be used.

In addition, if technology is developed for achieving an integrated circuit in substitute for an LSI based on separate technology that is an improvement of or which is derived from semiconductor technology, it goes without saying that such technology may be used to integrate the functional blocks. The application of bio technology is also possible.

Note that the specific embodiments described above mainly cover the invention with the following configuration.

The optical disk reproduction apparatus according to one aspect of the present invention is an optical disk reproduction apparatus for reproducing main information and sub information recorded on an optical disk comprising an optical head for reading a reproduction signal including the main information and the sub information based on a recording mark formed on the optical disk, a main information extraction unit for extracting the main information from the reproduction signal read with the optical head, and a sub information extraction unit for extracting the sub information from the reproduction signal read with the optical head, wherein the sub information extraction unit includes a reproduction accuracy determination unit for determining a reproduction accuracy of the sub information, an error correction timing control unit for deciding a timing of performing error correction of the sub information according to the reproduction accuracy determined with the reproduction accuracy determination unit, and an error correction unit for performing the error correction of the sub information according to the timing decided with the error correction timing control unit.

According to the foregoing configuration, since the reproduction accuracy of the sub information is determined and the timing of performing the error correction of the sub information is decided according to the determined reproduction accuracy, it is possible to prevent information that is different from the original sub information from being subjected to error correction erroneously, and stably reproduce the sub information as a result of performing the error correction in a state where the reproduction accuracy of the sub information is high.

Moreover, in the foregoing optical disk reproduction apparatus, preferably, the sub information extraction unit extracts the sub information that has been subjected to error correction encoding by detecting at least one among alteration of a predetermined pattern of data recorded in the pattern with the recording mark, modification of the recording mark, and displacement of the recording mark.

According to the foregoing configuration, the sub information that has been subjected to error correction encoding is extracted by detecting at least one among alteration of a predetermined pattern of data recorded in the pattern with the recording mark, modification of the recording mark, and displacement of the recording mark. Accordingly, it becomes difficult to easily duplicate the sub information, and the unauthorized duplication of the optical disk can be prevented thereby.

Moreover, in the foregoing optical disk reproduction apparatus, preferably, the sub information is repeatedly recorded a plurality of times in predetermined recording area units of the optical disk, and the sub information extraction unit extracts the sub information based on an integral value obtained by integrating a detection signal detected for each of the predetermined recording areas.

According to the foregoing configuration, the sub information is repeatedly recorded a plurality of times in predetermined recording area units of the optical disk. In addition, the sub information is extracted based on an integral value obtained by integrating a detection signal detected for each of the predetermined recording areas.

Accordingly, since the integration for detecting the sub information is implemented a plurality of times in succession, the sub information can be stably reproduced even if there is a major defect such as a scratch or dust on the optical disk.

Moreover, in the foregoing optical disk reproduction apparatus, preferably, the sub information extraction unit generates a correlation signal synchronized with the reproduction signal and integrates the correlation of the correlation signal and the detection signal.

According to the foregoing configuration, a correlation signal synchronized with the reproduction signal is generated and the correlation of the correlation signal and the detection signal is integrated. Accordingly, it becomes difficult for a third party that does not know the correlation signal to reproduce the sub information, and the copyright protection level of the optical disk can be reinforced.

Moreover, in the foregoing optical disk reproduction apparatus, preferably, the reproduction accuracy determination unit determines the reproduction accuracy based on the integral value. According to the foregoing configuration, the reproduction accuracy is determined based on the integral value.

Moreover, in the foregoing optical disk reproduction apparatus, preferably, the reproduction accuracy determination unit calculates a total value or average value of the integral value for each bit of the sub information, and determines the reproduction accuracy based on the calculated total value or average value.

According to the foregoing configuration, the total value or average value of the integral value for each bit of the sub information is calculated, and the reproduction accuracy is determined based on the calculated total value or average value. Accordingly, the reproduction accuracy of the sub information can be stably estimated based on the total value or the average value of the integral value.

Moreover, in the foregoing optical disk reproduction apparatus, preferably, the reproduction accuracy determination unit calculates the total value or average value of the integral value for each bit of the sub information, and determines whether the calculated total value or average value is greater than a predetermined threshold, and the error correction timing control unit instructs the error correction unit to perform the error correction when the reproduction accuracy determination unit determines that the total value or the average value is greater than the predetermined threshold.

According to the foregoing configuration, the total value or average value of the integral value for each bit of the sub information is calculated, and whether the calculated total value or average value is greater than a predetermined threshold is determined. Moreover, an instruction for performing the error correction is issued when it is determined that the total value or the average value is greater than the predetermined threshold.

Accordingly, since an instruction for performing the error correction is issued when the total value or average value of the integral value for each bit of the sub information is determined to be greater than a predetermined threshold in which the possibility of the sub information being erroneously subjected to error correction is low, it is possible to prevent information that is different from the original sub information from being subjected to error correction erroneously, and accurately reproduce the sub information.

Moreover, in the foregoing optical disk reproduction apparatus, preferably, the reproduction accuracy determination unit calculates a variation of the integral value for each bit of the sub information, and determines the reproduction accuracy based on the calculated variation.

According to the foregoing configuration, the variation of the integral value for each bit of the sub information is calculated, and the reproduction accuracy is determined based on the calculated variation. Accordingly, the reproduction accuracy of the sub information can be stably estimated based on the variation of the integral value.

Moreover, in the foregoing optical disk reproduction apparatus, preferably, the reproduction accuracy determination unit calculates a variation of the integral value for each bit of the sub information, and determines whether the calculated variation is smaller than a predetermined threshold, and the error correction timing control unit instructs the error correction unit to perform the error correction when the reproduction accuracy determination unit determines that the variation is smaller than the predetermined threshold.

According to the foregoing configuration, the variation of the integral value for each bit of the sub information is calculated, and whether the calculated variation is smaller than a predetermined threshold is determined. Moreover, an instruction for performing the error correction is issued when it is determined that the variation is smaller than the predetermined threshold.

Accordingly, since an instruction for performing the error correction is issued when the variation of the integral value for each bit of the sub information is determined to be smaller than a predetermined threshold in which the possibility of the sub information being erroneously subjected to error correction is low, it is possible to prevent information that is different from the original sub information from being subjected to error correction erroneously, and accurately reproduce the sub information.

The optical disk reproduction method according to another aspect of the present invention is an optical disk reproduction method for reproducing main information and sub information recorded on an optical disk comprising a reproduction signal reading step of reading a reproduction signal including the main information and the sub information based on a recording mark formed on the optical disk, a main information extraction step of extracting the main information from the reproduction signal read in the reproduction signal reading step, and a sub information extraction step of extracting the sub information from the reproduction signal read in the reproduction signal reading step, wherein the sub information extraction step includes a reproduction accuracy determination step of determining a reproduction accuracy of the sub information, an error correction timing control step of deciding a timing of performing error correction of the sub information according to the reproduction accuracy determined in the reproduction accuracy determination step, and an error correction step of performing the error correction of the sub information according to the timing decided in the error correction timing control step.

According to the foregoing configuration, since the reproduction accuracy of the sub information is determined and the timing of performing the error correction of the sub information is decided according to the determined reproduction accuracy, it is possible to prevent information that is different from the original sub information from being subjected to error correction erroneously, and stably reproduce the sub information as a result of performing the error correction in a state where the reproduction accuracy of the sub information is high.

The reproduction processing device according to another aspect of the present invention is a reproduction processing device for processing a reproduction signal including main information and sub information read based on a recording mark formed on an optical disk comprising a main information extraction unit for extracting the main information from the reproduction signal, and a sub information extraction unit for extracting the sub information from the reproduction signal, wherein the sub information extraction unit includes a reproduction accuracy determination unit for determining a reproduction accuracy of the sub information, an error correction timing control unit for deciding a timing of performing error correction of the sub information according to the reproduction accuracy determined with the reproduction accuracy determination unit, and an error correction unit for performing the error correction of the sub information according to the timing decided with the error correction timing control unit.

According to the foregoing configuration, since the reproduction accuracy of the sub information is determined and the timing of performing the error correction of the sub information is decided according to the determined reproduction accuracy, it is possible to prevent information that is different from the original sub information from being subjected to error correction erroneously, and stably reproduce the sub information as a result of performing the error correction in a state where the reproduction accuracy of the sub information is high.

The reproduction processing method according to another aspect of the present invention is a reproduction processing method for processing a reproduction signal including main information and sub information read based on a recording mark formed on an optical disk comprising a main information extraction step of extracting the main information from the reproduction signal, and a sub information extraction step of extracting the sub information from the reproduction signal, wherein the sub information extraction step includes a reproduction accuracy determination step of determining a reproduction accuracy of the sub information, an error correction timing control step of deciding a timing of performing error correction of the sub information according to the reproduction accuracy determined in the reproduction accuracy determination step, and an error correction step of performing the error correction of the sub information according to the timing decided in the error correction timing control step.

According to the foregoing configuration, since the reproduction accuracy of the sub information is determined and the timing of performing the error correction of the sub information is decided according to the determined reproduction accuracy, it is possible to prevent information that is different from the original sub information from being subjected to error correction erroneously, and stably reproduce the sub information as a result of performing the error correction in a state where the reproduction accuracy of the sub information is high.

Incidentally, the specific embodiments and examples in the detailed description of the invention are merely provided for demonstrating the technical content of the present invention, and the present invention should not be interpreted narrowly by being limited such specific examples. Thus, the present invention may be implemented in various modes within the spirit of this invention and the scope of claims provided below.

Industrial Applicability

The optical disk reproduction apparatus, the optical disk reproduction method, the reproduction processing device and the reproduction processing method according to the present invention are able to prevent information that is different from the original sub information from being subjected to error correction erroneously, and stably reproduce the sub information, and are effective as the optical disk reproduction apparatus and the optical disk reproduction method for reproducing sub information from an optical disk recorded with main information and sub information, and as the reproduction processing device and the reproduction processing method for processing a reproduction signal including main information and sub information read based on a recording mark formed on an optical disk.

The invention claimed is:

1. An optical disk reproduction apparatus for reproducing main information and sub information recorded on an optical disk, comprising:
    an optical head for reading a reproduction signal including the main information and the sub information based on a recording mark formed on the optical disk;
    a main information extraction unit for extracting the main information from the reproduction signal read with the optical head; and
    a sub information extraction unit for extracting the sub information from the reproduction signal read with the optical head,
    wherein the sub information extraction unit includes:
    a reproduction accuracy determination unit for determining a reproduction accuracy of the sub information;
    an error correction timing control unit for deciding a timing of starting error correction of the sub information according to the reproduction accuracy determined with the reproduction accuracy determination unit; and
    an error correction unit for starting the error correction of the sub information according to the timing decided with the error correction timing control unit, and
    wherein the sub information is repeatedly recorded a plurality of times in predetermined recording area units of the optical disk,
    the sub information extraction unit extracts the sub information based on an integral value obtained by integrating a detection signal detected for each of the predetermined recording areas, and
    the error correction timing control unit determines whether to start the error correction for each of the predetermined recording area units.

2. The optical disk reproduction apparatus according to claim 1,
    wherein the sub information extraction unit extracts the sub information that has been subjected to error correction encoding by detecting at least one among alteration of a predetermined pattern of data recorded in the pattern with the recording mark, modification of the recording mark, and displacement of the recording mark.

3. The optical disk reproduction apparatus according to claim 1,
    wherein the error correction timing control unit determines to start the error correction when the possibility of the error correction of the sub information being performed erroneously is low.

4. The optical disk reproduction apparatus according to claim 3,
    wherein the reproduction accuracy determination unit determines the reproduction accuracy based on the integral value.

5. The optical disk reproduction apparatus according to claim 4,
    wherein the reproduction accuracy determination unit includes: a comparator for comparing an integral value for each bit of the sub information with a predetermined integral threshold; a bit count calculation unit for counting a bit count that is determined to be greater or smaller than the predetermined integral threshold; and a bit count comparator for comparing the counted bit count with a predetermined bit count threshold, and
    determines the reproduction accuracy based on the counted bit count.

6. The optical disk reproduction apparatus according to claim 5,
    wherein the value of the bit count threshold corresponds to the bit count that is correctable by the error correction encoding of the sub information.

7. The optical disk reproduction apparatus according to claim 4,
    wherein the reproduction accuracy determination unit calculates a total value or an average value of the integral value for each bit of the sub information, and determines the reproduction accuracy based on the calculated total value or average value.

8. The optical disk reproduction apparatus according to claim 7,
    wherein the reproduction accuracy determination unit calculates the total value or average value of the integral value for each bit of the sub information, and determines whether the calculated total value or average value is greater than a predetermined threshold, and
    wherein the error correction timing control unit instructs the error correction unit to perform the error correction when the reproduction accuracy determination unit determines that the total value or the average value is greater than the predetermined threshold.

9. The optical disk reproduction apparatus according to claim 4,
    wherein the reproduction accuracy determination unit calculates a variation of the integral value for each bit of the sub information, and determines the reproduction accuracy based on the calculated variation.

10. The optical disk reproduction apparatus according to claim 9,
    wherein the reproduction accuracy determination unit calculates a variation of the integral value for each bit of the sub information, and determines whether the calculated variation is smaller than a predetermined threshold, and
    the error correction timing control unit instructs the error correction unit to perform the error correction when the reproduction accuracy determination unit determines that the variation is smaller than the predetermined threshold.

11. An optical disk reproduction method for reproducing main information and sub information recorded on an optical disk, comprising:

a reproduction signal reading step of reading a reproduction signal including the main information and the sub information based on a recording mark formed on the optical disk;

a main information extraction step of extracting the main information from the reproduction signal read in the reproduction signal reading step; and a sub information extraction step of extracting the sub information from the reproduction signal read in the reproduction signal reading step, wherein the sub information extraction step includes:

a reproduction accuracy determination step of determining a reproduction accuracy of the sub information;

an error correction timing control step of deciding a timing of starting error correction of the sub information according to the reproduction accuracy determined in the reproduction accuracy determination step; and an error correction step of starting the error correction of the sub information according to the timing decided in the error correction timing control step, and wherein the sub information is repeatedly recorded a plurality of times in predetermined recording area units of the optical disk, the sub information extraction step extracts the sub information based on an integral value obtained by integrating a detection signal detected for each of the predetermined recording areas, and the error correction timing control step determines whether to start the error correction for each of the predetermined recording area units.

12. A reproduction processing device for processing a reproduction signal including main information and sub information read based on a recording mark formed on an optical disk, comprising:

a main information extraction unit for extracting the main information from the reproduction signal; and a sub information extraction unit for extracting the sub information from the reproduction signal, wherein the sub information extraction unit includes:

a reproduction accuracy determination unit for determining a reproduction accuracy of the sub information;

an error correction timing control unit for deciding a timing of starting error correction of the sub information according to the reproduction accuracy determined with the reproduction accuracy determination unit; and an error correction unit for starting the error correction of the sub information according to the timing decided with the error correction timing control unit, and wherein the sub information is repeatedly recorded a plurality of times in predetermined recording area units of the optical disk, the sub information extraction unit extracts the sub information based on an integral value obtained by integrating a detection signal detected for each of the predetermined recording areas, and the error correction timing control unit determines whether to start the error correction for each of the predetermined recording area units.

13. A reproduction processing method for processing a reproduction signal including main information and sub information read based on a recording mark formed on an optical disk, comprising:

a main information extraction step of extracting the main information from the reproduction signal; and a sub information extraction step of extracting the sub information from the reproduction signal, wherein the sub information extraction step includes:

a reproduction accuracy determination step of determining a reproduction accuracy of the sub information;

an error correction timing control step of deciding a timing of starting error correction of the sub information according to the reproduction accuracy determined in the reproduction accuracy determination step; and an error correction step of starting the error correction of the sub information according to the timing decided in the error correction timing control step, and wherein the sub information is repeatedly recorded a plurality of times in predetermined recording area units of the optical disk, the sub information extraction step extracts the sub information based on an integral value obtained by integrating a detection signal detected for each of the predetermined recording areas, and the error correction timing control step determines whether to start the error correction for each of the predetermined recording area units.

* * * * *